US008630898B1

(12) United States Patent
Knackstedt et al.

(10) Patent No.: US 8,630,898 B1
(45) Date of Patent: Jan. 14, 2014

(54) STORED VALUE CARD PROVIDED WITH MERCHANDISE AS REBATE

(75) Inventors: Lee Knackstedt, Bear, DE (US); Scott Rau, Pottstown, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 1635 days.

(21) Appl. No.: 11/061,570

(22) Filed: Feb. 22, 2005

(51) Int. Cl.
*G06Q 30/00* (2012.01)

(52) U.S. Cl.
USPC .................................. 705/14.34; 705/14.17

(58) Field of Classification Search
USPC ................ 705/1, 14, 50, 64–65, 14.17, 14.34
See application file for complete search history.

(56) References Cited

U.S. PATENT DOCUMENTS

| | | |
|---|---|---|
| 3,634,669 A | 1/1972 | Soumas et al. |
| 3,946,206 A | 3/1976 | Darjany |
| 4,047,033 A | 9/1977 | Malmberg et al. |
| 4,465,206 A | 8/1984 | Sorel et al. |
| 4,545,838 A | 10/1985 | Minkus et al. |
| 4,582,985 A | 4/1986 | Lofberg |
| 4,614,861 A | 9/1986 | Riley et al. |
| 4,634,845 A | 1/1987 | Riley et al. |
| 4,689,478 A | 8/1987 | Hale et al. |
| 4,700,055 A | 10/1987 | Kashkashian, Jr. |
| 4,746,787 A | 5/1988 | Okada et al. |
| 4,750,119 A | 6/1988 | Cohen et al. |
| 4,752,676 A | 6/1988 | Leonard et al. |
| 4,754,418 A | 6/1988 | Hara |
| 4,766,293 A | 8/1988 | Boston |
| 4,766,539 A | 8/1988 | Fox |
| 4,789,928 A | 12/1988 | Fujisaki |
| 4,822,985 A | 4/1989 | Boggan et al. |
| 4,831,242 A | 5/1989 | Englehardt |
| 4,831,526 A | 5/1989 | Luchs |
| 4,868,376 A | 9/1989 | Lessin et al. |
| 4,870,259 A | 9/1989 | Boggan et al. |
| 4,882,675 A | 11/1989 | Nichtberger et al. |
| 4,897,533 A | 1/1990 | Lyszczarz |
| 4,906,826 A | 3/1990 | Spencer |
| 4,908,521 A | 3/1990 | Boggan et al. |
| 4,923,288 A | 5/1990 | Allen et al. |
| 4,928,001 A | 5/1990 | Masada |

(Continued)

FOREIGN PATENT DOCUMENTS

| | | |
|---|---|---|
| CA | 2293321 | 6/1998 |
| EP | 959440 | 11/1999 |

(Continued)

OTHER PUBLICATIONS

Meridian Award Cards, JA8251.

(Continued)

*Primary Examiner* — James D Nigh
(74) *Attorney, Agent, or Firm* — Hunton & Williams LLP

(57) ABSTRACT

A system and method for creating a stored value account based on a purchase transaction are provided. An indicia of an identifier to be distributed to a customer at a point of sale as a result of a purchase is passed. A request to activate a stored value account associated with the identifier is received from the customer, wherein the request comprises the identifier. The stored value account is activated by a computer processor. The stored value account comprises information about a rebate value that is associated with the purchase and usable by the customer.

30 Claims, 5 Drawing Sheets

(56) References Cited

U.S. PATENT DOCUMENTS

| | | | |
|---|---|---|---|
| 4,941,090 A | 7/1990 | McCarthy |
| 4,943,707 A | 7/1990 | Boggan |
| 4,953,085 A | 8/1990 | Atkins |
| 4,954,985 A | 9/1990 | Yamazaki |
| 4,961,142 A | 10/1990 | Elliott et al. |
| 4,968,873 A | 11/1990 | Dethloff et al. |
| 4,975,840 A | 12/1990 | DeTore et al. |
| 4,978,401 A | 12/1990 | Bonomi |
| 4,992,940 A | 2/1991 | Dworkin |
| 5,025,372 A | 6/1991 | Burton et al. |
| 5,049,728 A | 9/1991 | Rovin |
| 5,055,662 A | 10/1991 | Hasegawa |
| 5,080,748 A | 1/1992 | Bonomi |
| 5,095,194 A | 3/1992 | Barbanell |
| 5,117,355 A | 5/1992 | McCarthy |
| 5,146,068 A | 9/1992 | Ugawa et al. |
| 5,175,416 A | 12/1992 | Mansvelt |
| 5,180,901 A | 1/1993 | Hiramatsu |
| 5,192,947 A | 3/1993 | Neustein |
| 5,202,286 A | 4/1993 | Nakatani |
| 5,202,826 A | 4/1993 | McCarthy |
| 5,206,488 A | 4/1993 | Teicher |
| 5,206,803 A | 4/1993 | Vitagliano |
| 5,218,631 A | 6/1993 | Katz |
| 5,247,190 A | 9/1993 | Friend et al. |
| 5,276,311 A | 1/1994 | Hennige |
| 5,287,268 A | 2/1994 | McCarthy |
| 5,287,269 A | 2/1994 | Dorrough et al. |
| 5,297,026 A | 3/1994 | Hoffman |
| 5,311,594 A | 5/1994 | Penzias |
| 5,326,959 A | 7/1994 | Perazza |
| 5,326,960 A | 7/1994 | Tannenbaum |
| 5,328,809 A | 7/1994 | Holmes et al. |
| 5,339,239 A | 8/1994 | Manabe et al. |
| 5,349,633 A | 9/1994 | Katz |
| 5,350,906 A | 9/1994 | Brody et al. |
| 5,359,183 A | 10/1994 | Skodlar |
| 5,365,575 A | 11/1994 | Katz |
| 5,383,113 A | 1/1995 | Knight |
| 5,397,881 A | 3/1995 | Mannik |
| 5,399,502 A | 3/1995 | Friend et al. |
| 5,401,827 A | 3/1995 | Holmes et al. |
| RE34,915 E | 4/1995 | Nichtberger et al. |
| 5,424,524 A | 6/1995 | Ruppert et al. |
| 5,450,477 A | 9/1995 | Amarant et al. |
| 5,453,601 A | 9/1995 | Rosen |
| 5,455,407 A | 10/1995 | Rosen |
| 5,459,306 A | 10/1995 | Stein et al. |
| 5,465,206 A | 11/1995 | Hilt et al. |
| 5,466,919 A | 11/1995 | Hovakimian |
| 5,471,669 A | 11/1995 | Lidman |
| 5,477,038 A | 12/1995 | Levine et al. |
| 5,477,040 A | 12/1995 | Lalonde |
| 5,479,494 A | 12/1995 | Clitherow |
| 5,482,139 A | 1/1996 | Rivalto |
| 5,483,444 A | 1/1996 | Malark et al. |
| 5,483,445 A | 1/1996 | Pickering |
| 5,500,514 A | 3/1996 | Veeneman et al. |
| 5,511,114 A | 4/1996 | Stimson et al. |
| 5,512,654 A | 4/1996 | Holmes et al. |
| 5,513,102 A | 4/1996 | Auriemma |
| 5,521,363 A | 5/1996 | Tannenbaum |
| 5,530,232 A | 6/1996 | Taylor |
| 5,530,235 A | 6/1996 | Stefik et al. |
| 5,537,314 A | 7/1996 | Kanter |
| 5,544,086 A | 8/1996 | Davis et al. |
| 5,544,246 A | 8/1996 | Mandelbaum et al. |
| 5,553,120 A | 9/1996 | Katz |
| 5,577,109 A | 11/1996 | Stimson et al. |
| 5,578,808 A | 11/1996 | Taylor |
| 5,581,064 A | 12/1996 | Riley et al. |
| 5,585,787 A | 12/1996 | Wallerstein |
| 5,590,038 A | 12/1996 | Pitroda |
| 5,592,560 A | 1/1997 | Deaton et al. |
| 5,604,542 A | 2/1997 | Dedrick |
| 5,608,785 A | 3/1997 | Kasday |
| 5,612,868 A | 3/1997 | Off |
| 5,621,787 A | 4/1997 | McKoy et al. |
| 5,621,812 A | 4/1997 | Deaton et al. |
| 5,637,845 A | 6/1997 | Kolls |
| 5,638,457 A | 6/1997 | Deaton et al. |
| 5,642,279 A | 6/1997 | Stone |
| 5,642,485 A | 6/1997 | Deaton et al. |
| 5,644,723 A | 7/1997 | Deaton et al. |
| 5,644,727 A | 7/1997 | Atkins |
| 5,649,114 A | 7/1997 | Deaton et al. |
| 5,649,117 A | 7/1997 | Landry |
| 5,649,118 A | 7/1997 | Carlisle et al. |
| 5,653,914 A | 8/1997 | Holmes et al. |
| 5,659,741 A | 8/1997 | Eberhardt |
| 5,664,110 A | 9/1997 | Green et al. |
| 5,664,157 A | 9/1997 | Takahira et al. |
| 5,665,953 A | 9/1997 | Mazzamuto |
| 5,672,678 A | 9/1997 | Holmes et al. |
| 5,675,607 A | 10/1997 | Alesio et al. |
| 5,675,662 A | 10/1997 | Deaton et al. |
| 5,677,955 A | 10/1997 | Doggett et al. |
| 5,684,291 A | 11/1997 | Taskett |
| 5,687,322 A | 11/1997 | Deaton et al. |
| 5,689,100 A | 11/1997 | Carrithers et al. |
| 5,689,650 A | 11/1997 | McClelland et al. |
| 5,692,132 A | 11/1997 | Hogan |
| 5,696,907 A | 12/1997 | Tom |
| 5,699,528 A | 12/1997 | Hogan |
| 5,703,344 A | 12/1997 | Bezy et al. |
| 5,704,046 A | 12/1997 | Hogan |
| 5,705,798 A | 1/1998 | Tarbox |
| 5,708,422 A | 1/1998 | Blonder et al. |
| 5,710,458 A | 1/1998 | Iwasaki |
| 5,710,886 A | 1/1998 | Christensen et al. |
| 5,710,887 A | 1/1998 | Chelliah |
| 5,710,889 A | 1/1998 | Clark et al. |
| 5,715,399 A | 2/1998 | Bezos |
| 5,717,925 A | 2/1998 | Harper et al. |
| 5,721,768 A | 2/1998 | Stimson et al. |
| 5,721,781 A | 2/1998 | Deo et al. |
| 5,726,884 A | 3/1998 | Sturgeon et al. |
| 5,727,153 A | 3/1998 | Powell |
| 5,728,998 A | 3/1998 | Novis et al. |
| 5,729,693 A | 3/1998 | Holda-Fleck |
| 5,734,154 A | 3/1998 | Jachimowicz et al. |
| 5,734,838 A | 3/1998 | Robinson |
| 5,736,728 A | 4/1998 | Matsubara |
| 5,737,421 A | 4/1998 | Audebert |
| 5,740,549 A | 4/1998 | Reilly et al. |
| 5,742,775 A | 4/1998 | King |
| 5,745,049 A | 4/1998 | Akiyama et al. |
| 5,745,706 A | 4/1998 | Wolfberg et al. |
| 5,749,075 A | 5/1998 | Toader et al. |
| 5,760,381 A | 6/1998 | Stich et al. |
| 5,765,138 A | 6/1998 | Aycock et al. |
| 5,765,141 A | 6/1998 | Spector |
| 5,770,843 A | 6/1998 | Rose et al. |
| 5,770,849 A | 6/1998 | Novis et al. |
| 5,774,870 A | 6/1998 | Storey |
| 5,777,305 A | 7/1998 | Smith et al. |
| 5,777,306 A | 7/1998 | Masuda |
| 5,777,903 A | 7/1998 | Piosenka et al. |
| 5,778,067 A | 7/1998 | Jones et al. |
| 5,787,156 A | 7/1998 | Katz |
| 5,787,404 A | 7/1998 | Fernandez-Holman |
| 5,789,733 A | 8/1998 | Jachimowicz et al. |
| 5,794,207 A | 8/1998 | Walker |
| 5,799,087 A | 8/1998 | Rosen |
| 5,802,176 A | 9/1998 | Audebert |
| 5,805,719 A | 9/1998 | Pare et al. |
| 5,806,042 A | 9/1998 | Kelly et al. |
| 5,806,044 A | 9/1998 | Powell |
| 5,806,045 A | 9/1998 | Biorge |
| 5,807,627 A | 9/1998 | Friend et al. |
| 5,809,478 A | 9/1998 | Greco |
| 5,815,657 A | 9/1998 | Williams et al. |
| 5,815,658 A | 9/1998 | Kuriyama |
| 5,819,234 A | 10/1998 | Slavin et al. |

(56) References Cited

U.S. PATENT DOCUMENTS

| | | |
|---|---|---|
| 5,819,237 A | 10/1998 | Garman |
| 5,832,457 A | 11/1998 | O'Brien |
| 5,832,488 A | 11/1998 | Eberhardt |
| 5,835,061 A | 11/1998 | Stewart |
| 5,835,576 A | 11/1998 | Katz |
| 5,839,113 A | 11/1998 | Federau et al. |
| 5,845,259 A | 12/1998 | West et al. |
| 5,845,260 A | 12/1998 | Nakano et al. |
| 5,852,811 A | 12/1998 | Atkins |
| 5,852,812 A | 12/1998 | Reeder |
| 5,857,079 A | 1/1999 | Claus et al. |
| 5,857,175 A | 1/1999 | Day |
| 5,857,709 A | 1/1999 | Chock |
| 5,859,419 A | 1/1999 | Wynn |
| 5,864,609 A | 1/1999 | Cross et al. |
| 5,864,828 A | 1/1999 | Atkins |
| 5,864,830 A | 1/1999 | Armetta et al. |
| RE36,116 E | 2/1999 | McCarthy |
| 5,870,718 A | 2/1999 | Spector |
| 5,870,721 A | 2/1999 | Norris |
| 5,875,437 A | 2/1999 | Atkins |
| 5,883,377 A | 3/1999 | Chapin, Jr. |
| 5,883,810 A | 3/1999 | Franklin et al. |
| 5,884,271 A | 3/1999 | Pitroda |
| 5,884,278 A | 3/1999 | Powell |
| 5,884,285 A | 3/1999 | Atkins |
| 5,887,065 A | 3/1999 | Audebert |
| 5,890,138 A | 3/1999 | Godin et al. |
| 5,890,140 A | 3/1999 | Clark et al. |
| H1794 H | 4/1999 | Claus |
| 5,897,620 A | 4/1999 | Walker et al. |
| 5,905,246 A | 5/1999 | Fajkowski |
| 5,911,135 A | 6/1999 | Atkins |
| 5,911,136 A | 6/1999 | Atkins |
| 5,914,472 A | 6/1999 | Foladare et al. |
| 5,920,629 A | 7/1999 | Rosen |
| 5,920,844 A | 7/1999 | Hotta et al. |
| 5,920,847 A | 7/1999 | Kolling et al. |
| 5,923,734 A | 7/1999 | Taskett |
| 5,926,800 A | 7/1999 | Baronowski et al. |
| 5,930,217 A | 7/1999 | Kayanuma |
| 5,931,764 A | 8/1999 | Freeman et al. |
| 5,933,817 A | 8/1999 | Hucal |
| 5,937,068 A | 8/1999 | Audebert |
| 5,940,811 A | 8/1999 | Norris |
| 5,952,641 A | 9/1999 | Korshun |
| 5,953,423 A | 9/1999 | Rosen |
| 5,953,710 A | 9/1999 | Fleming |
| 5,955,961 A | 9/1999 | Wallerstein |
| 5,963,648 A | 10/1999 | Rosen |
| 5,970,479 A | 10/1999 | Shepherd |
| 5,970,480 A | 10/1999 | Kalina |
| 5,974,399 A | 10/1999 | Giuliani et al. |
| RE36,365 E | 11/1999 | Levine et al. |
| 5,984,180 A | 11/1999 | Albrecht |
| 5,984,191 A | 11/1999 | Chapin, Jr. |
| 5,987,434 A | 11/1999 | Libman |
| 5,988,509 A | 11/1999 | Taskett |
| 5,991,413 A | 11/1999 | Arditti et al. |
| 5,991,743 A | 11/1999 | Irving et al. |
| 5,991,748 A | 11/1999 | Taskett |
| 5,991,750 A | 11/1999 | Watson |
| 6,000,608 A | 12/1999 | Dorf |
| 6,000,832 A | 12/1999 | Franklin et al. |
| 6,002,383 A | 12/1999 | Shimada |
| 6,003,762 A | 12/1999 | Hayashida |
| 6,004,681 A | 12/1999 | Epstein et al. |
| 6,006,988 A | 12/1999 | Behrmann et al. |
| 6,009,415 A | 12/1999 | Shurling et al. |
| 6,014,636 A | 1/2000 | Reeder |
| 6,014,638 A | 1/2000 | Burge et al. |
| 6,014,645 A | 1/2000 | Cunningham |
| 6,014,749 A | 1/2000 | Gloor et al. |
| 6,016,482 A | 1/2000 | Molinari et al. |
| 6,016,954 A | 1/2000 | Abe et al. |
| 6,019,284 A | 2/2000 | Freeman et al. |
| 6,026,370 A | 2/2000 | Jermyn |
| 6,029,139 A | 2/2000 | Cunningham et al. |
| 6,029,890 A | 2/2000 | Austin |
| 6,032,136 A | 2/2000 | Brake, Jr. et al. |
| 6,036,099 A | 3/2000 | Leighton |
| 6,038,292 A | 3/2000 | Thomas |
| 6,038,552 A | 3/2000 | Fleischl et al. |
| 6,041,315 A | 3/2000 | Pollin |
| 6,045,042 A | 4/2000 | Ohno |
| 6,047,067 A | 4/2000 | Rosen |
| 6,047,268 A | 4/2000 | Bartoli et al. |
| 6,049,463 A | 4/2000 | O'Malley et al. |
| 6,049,773 A | 4/2000 | McCormack et al. |
| 6,049,782 A | 4/2000 | Gottesman et al. |
| 6,058,378 A | 5/2000 | Clark et al. |
| 6,064,985 A | 5/2000 | Anderson |
| 6,065,675 A | 5/2000 | Teicher |
| 6,068,183 A | 5/2000 | Freeman et al. |
| 6,070,067 A | 5/2000 | Nguyen et al. |
| 6,070,147 A | 5/2000 | Harms et al. |
| 6,070,153 A | 5/2000 | Simpson |
| 6,076,068 A | 6/2000 | DeLapa et al. |
| 6,076,072 A | 6/2000 | Libman |
| 6,078,888 A | 6/2000 | Johnson, Jr. |
| 6,078,891 A | 6/2000 | Riordan et al. |
| 6,091,817 A | 7/2000 | Bertina et al. |
| 6,092,056 A | 7/2000 | Tull, Jr. et al. |
| 6,095,412 A | 8/2000 | Bertina et al. |
| 6,095,416 A | 8/2000 | Grant et al. |
| 6,098,053 A | 8/2000 | Slater |
| 6,105,011 A | 8/2000 | Morrison, Jr. |
| 6,105,865 A | 8/2000 | Hardesty |
| 6,115,458 A | 9/2000 | Taskett |
| 6,119,932 A | 9/2000 | Maloney et al. |
| 6,122,623 A | 9/2000 | Garman |
| 6,128,598 A | 10/2000 | Walker et al. |
| 6,128,599 A | 10/2000 | Walker et al. |
| 6,129,274 A | 10/2000 | Suzuki |
| 6,134,309 A * | 10/2000 | Carson ............... 379/114.2 |
| 6,134,536 A | 10/2000 | Shepherd |
| 6,138,917 A | 10/2000 | Chapin, Jr. |
| 6,145,741 A | 11/2000 | Wisdom et al. |
| 6,148,297 A | 11/2000 | Swor et al. |
| 6,161,096 A | 12/2000 | Bell |
| 6,163,770 A | 12/2000 | Gamble et al. |
| 6,164,533 A | 12/2000 | Barton |
| 6,167,385 A | 12/2000 | Hartley-Urquhart |
| 6,169,975 B1 | 1/2001 | White et al. |
| 6,173,267 B1 | 1/2001 | Cairns |
| 6,182,048 B1 | 1/2001 | Osborn et al. |
| 6,182,894 B1 | 2/2001 | Hackett et al. |
| 6,186,793 B1 | 2/2001 | Brubaker |
| 6,189,787 B1 | 2/2001 | Dorf |
| 6,195,644 B1 | 2/2001 | Bowie |
| 6,202,053 B1 | 3/2001 | Christiansen et al. |
| RE37,122 E | 4/2001 | Levine et al. |
| 6,227,447 B1 | 5/2001 | Campisano |
| 6,243,688 B1 | 6/2001 | Kalina |
| 6,263,316 B1 | 7/2001 | Khan et al. |
| 6,265,977 B1 | 7/2001 | Vega et al. |
| 6,278,981 B1 | 8/2001 | Dembo et al. |
| 6,295,522 B1 | 9/2001 | Boesch |
| 6,298,336 B1 | 10/2001 | Davis et al. |
| 6,308,268 B1 | 10/2001 | Audebert |
| 6,336,099 B1 | 1/2002 | Barnett et al. |
| 6,341,724 B2 | 1/2002 | Campisano |
| 6,343,743 B1 | 2/2002 | Lamla |
| 6,345,261 B1 | 2/2002 | Feidelson |
| 6,345,766 B1 | 2/2002 | Taskett et al. |
| 6,349,291 B1 | 2/2002 | Varma |
| 6,360,954 B1 | 3/2002 | Barnardo |
| 6,366,220 B1 | 4/2002 | Elliott |
| 6,373,969 B1 | 4/2002 | Adler |
| 6,377,669 B1 | 4/2002 | Walker et al. |
| 6,385,591 B1 | 5/2002 | Mankoff |
| 6,386,444 B1 | 5/2002 | Sullivan |
| 6,397,202 B1 | 5/2002 | Higgins et al. |
| 6,402,039 B1 | 6/2002 | Freeman et al. |

(56) References Cited

U.S. PATENT DOCUMENTS

| | | | |
|---|---|---|---|
| 6,405,182 B1 | 6/2002 | Cuervo | |
| 6,422,459 B1 | 7/2002 | Kawan | |
| 6,422,462 B1 | 7/2002 | Cohen | |
| 6,424,029 B1 | 7/2002 | Giesler | |
| 6,429,927 B1 | 8/2002 | Borza | |
| 6,434,259 B1 | 8/2002 | Hamid et al. | |
| 6,446,210 B1 | 9/2002 | Borza | |
| 6,450,407 B1 | 9/2002 | Freeman et al. | |
| 6,463,039 B1 | 10/2002 | Ricci et al. | |
| 6,467,684 B2 | 10/2002 | Fite et al. | |
| 6,473,500 B1 | 10/2002 | Risafi et al. | |
| 6,484,144 B2 | 11/2002 | Martin et al. | |
| 6,484,148 B1 | 11/2002 | Boyd | |
| 6,498,861 B1 | 12/2002 | Hamid et al. | |
| 6,505,168 B1 | 1/2003 | Rothman et al. | |
| 6,560,578 B2 | 5/2003 | Eldering | |
| 6,567,786 B1 * | 5/2003 | Bibelnieks et al. | 705/14.44 |
| 6,574,603 B1 | 6/2003 | Dickson et al. | |
| 6,581,839 B1 | 6/2003 | Lasch et al. | |
| 6,601,761 B1 | 8/2003 | Katis | |
| 6,609,111 B1 | 8/2003 | Bell | |
| RE38,255 E | 9/2003 | Levine et al. | |
| 6,615,189 B1 | 9/2003 | Phillips et al. | |
| 6,615,190 B1 | 9/2003 | Slater | |
| 6,625,582 B2 | 9/2003 | Richman et al. | |
| 6,631,849 B2 | 10/2003 | Blossom | |
| 6,641,049 B2 | 11/2003 | Luu | |
| 6,641,050 B2 | 11/2003 | Kelley et al. | |
| 6,675,127 B2 | 1/2004 | LaBlanc et al. | |
| 6,687,222 B1 | 2/2004 | Mittal et al. | |
| 6,693,544 B1 | 2/2004 | Hebbecker | |
| 6,742,704 B2 | 6/2004 | Fitzmaurice et al. | |
| 6,745,938 B2 | 6/2004 | Sullivan | |
| 6,793,135 B1 * | 9/2004 | Ryoo | 235/383 |
| 6,802,008 B1 | 10/2004 | Ikefuji et al. | |
| 6,805,287 B2 | 10/2004 | Bishop | |
| 6,865,547 B1 | 3/2005 | Brake, Jr. et al. | |
| 6,868,426 B1 | 3/2005 | Mankoff | |
| 6,876,971 B1 | 4/2005 | Burke | |
| 6,901,372 B1 | 5/2005 | Helzerman | |
| 7,006,992 B1 | 2/2006 | Packwood | |
| 7,082,415 B1 * | 7/2006 | Robinson et al. | 705/67 |
| 7,092,916 B2 * | 8/2006 | Diveley et al. | 705/74 |
| 7,093,761 B2 * | 8/2006 | Smith et al. | 235/462.07 |
| 7,104,443 B1 | 9/2006 | Paul et al. | |
| 7,107,249 B2 * | 9/2006 | Dively et al. | 705/74 |
| 7,216,091 B1 * | 5/2007 | Blandina et al. | 705/17 |
| 7,243,839 B2 * | 7/2007 | Beck et al. | 235/380 |
| 7,252,223 B2 * | 8/2007 | Schofield | 235/379 |
| 7,315,843 B2 * | 1/2008 | Diveley et al. | 705/40 |
| 7,398,248 B2 * | 7/2008 | Phillips et al. | 705/39 |
| 2001/0011243 A1 | 8/2001 | Dembo et al. | |
| 2001/0027441 A1 | 10/2001 | Wankmueller | |
| 2001/0034647 A1 * | 10/2001 | Marks et al. | 705/14 |
| 2001/0034682 A1 | 10/2001 | Knight et al. | |
| 2001/0037315 A1 | 11/2001 | Saliba et al. | |
| 2001/0044293 A1 | 11/2001 | Morgan | |
| 2001/0047342 A1 | 11/2001 | Cuervo | |
| 2001/0054003 A1 | 12/2001 | Chien et al. | |
| 2001/0056398 A1 | 12/2001 | Scheirer | |
| 2002/0019803 A1 | 2/2002 | Muller | |
| 2002/0026418 A1 | 2/2002 | Koppel et al. | |
| 2002/0046255 A1 | 4/2002 | Moore et al. | |
| 2002/0062235 A1 | 5/2002 | Wahlbin et al. | |
| 2002/0062249 A1 * | 5/2002 | Iannacci | 705/14 |
| 2002/0065720 A1 * | 5/2002 | Carswell et al. | 705/14 |
| 2002/0077978 A1 | 6/2002 | O'Leary et al. | |
| 2002/0091572 A1 | 7/2002 | Anderson et al. | |
| 2002/0091631 A1 | 7/2002 | Usui | |
| 2002/0095365 A1 | 7/2002 | Slavin et al. | |
| 2002/0099652 A1 * | 7/2002 | Herzen et al. | 705/39 |
| 2002/0104878 A1 | 8/2002 | Seifert et al. | |
| 2002/0116271 A1 | 8/2002 | Mankoff | |
| 2002/0116330 A1 | 8/2002 | Hed et al. | |
| 2002/0120627 A1 | 8/2002 | Mankoff | |
| 2002/0120642 A1 | 8/2002 | Fetherston | |
| 2002/0143703 A1 | 10/2002 | Razvan et al. | |
| 2002/0147662 A1 | 10/2002 | Anderson | |
| 2002/0165820 A1 | 11/2002 | Anvekar et al. | |
| 2002/0169719 A1 * | 11/2002 | Dively et al. | 705/40 |
| 2002/0174016 A1 * | 11/2002 | Cuervo | 705/16 |
| 2002/0174018 A1 * | 11/2002 | Bunger et al. | 705/26 |
| 2002/0178025 A1 * | 11/2002 | Hansen et al. | 705/1 |
| 2003/0004828 A1 | 1/2003 | Epstein | |
| 2003/0023549 A1 | 1/2003 | Armes et al. | |
| 2003/0028518 A1 | 2/2003 | Mankoff | |
| 2003/0033211 A1 | 2/2003 | Haines et al. | |
| 2003/0033246 A1 | 2/2003 | Slater | |
| 2003/0046249 A1 | 3/2003 | Wu | |
| 2003/0053609 A1 | 3/2003 | Risafi et al. | |
| 2003/0101119 A1 | 5/2003 | Parsons et al. | |
| 2003/0105672 A1 | 6/2003 | Epstein et al. | |
| 2003/0135462 A1 | 7/2003 | Brake, Jr. et al. | |
| 2003/0140004 A1 | 7/2003 | O'Leary et al. | |
| 2003/0144935 A1 | 7/2003 | Sobek | |
| 2003/0154125 A1 | 8/2003 | Mittal et al. | |
| 2003/0154163 A1 * | 8/2003 | Phillips et al. | 705/39 |
| 2003/0163403 A1 | 8/2003 | Chen et al. | |
| 2003/0163416 A1 | 8/2003 | Kitajima | |
| 2003/0172040 A1 | 9/2003 | Kemper et al. | |
| 2003/0195808 A1 | 10/2003 | Brown et al. | |
| 2003/0200143 A9 | 10/2003 | Walker et al. | |
| 2003/0200180 A1 | 10/2003 | Phelan et al. | |
| 2003/0216965 A1 | 11/2003 | Libman | |
| 2004/0024672 A1 | 2/2004 | Brake, Jr. et al. | |
| 2004/0030626 A1 | 2/2004 | Libman | |
| 2004/0039588 A1 | 2/2004 | Libman | |
| 2004/0098351 A1 | 5/2004 | Duke | |
| 2004/0118914 A1 * | 6/2004 | Smith et al. | 235/380 |
| 2004/0215507 A1 * | 10/2004 | Levitt et al. | 705/14 |
| 2004/0243498 A1 | 12/2004 | Duke | |
| 2005/0021400 A1 | 1/2005 | Postrel | |
| 2005/0027649 A1 | 2/2005 | Cech | |
| 2005/0035192 A1 * | 2/2005 | Bonalle et al. | 235/379 |
| 2005/0071230 A1 | 3/2005 | Mankoff | |
| 2005/0075932 A1 | 4/2005 | Mankoff | |
| 2005/0091138 A1 | 4/2005 | Awatsu | |
| 2005/0171898 A1 | 8/2005 | Bishop et al. | |
| 2005/0199705 A1 * | 9/2005 | Beck et al. | 235/380 |
| 2005/0269396 A1 * | 12/2005 | Schofield | 235/379 |
| 2005/0273387 A1 * | 12/2005 | Previdi | 705/14 |

FOREIGN PATENT DOCUMENTS

| | | |
|---|---|---|
| GB | 2275654 A | 9/1994 |
| GB | 2376787 | 12/2002 |
| GB | 2377071 | 12/2002 |
| GB | 2377314 | 1/2003 |
| WO | WO 94/29112 | 12/1994 |
| WO | WO 97/41673 | 11/1997 |
| WO | WO 98/59307 | 12/1998 |
| WO | WO 99/05633 | 2/1999 |
| WO | WO 01/69347 | 9/2001 |
| WO | WO 01/69347 A2 | 9/2001 |
| WO | WO 01/69347 A3 | 9/2001 |
| WO | WO 2005/043277 A3 | 5/2005 |

OTHER PUBLICATIONS

Meridian—the leader in card marketing, JA8343.
Incenticard, JA8329.
Card Based Award Systems, JA8309.
Meridicard vs. Debit Cards, JA7917.
Award Card Comparision, JA7922.
How is it Different?, JA8331.
5500—FDIC General Counsel's Opinion No. 8—Stored Value Cards, 61 Fed. Reg. 40490, http://www.fdic.gov/regulations/laws/rules/5500-500.html, Aug. 2, 1996.
Song, A Card That Asks for ID, Time Magazine, Apr. 12, 2004, 1 page.
A Store Card Issuer Looks for Lift from Electronic Gift Certificates, Credit Card News, Feb. 1, 1995, 2 pages.
Hotchkiss, ATM's at the head of their class, Bank Marketing, vol. 29, No. 3, Mar. 1997, pp. 26-32.

(56) References Cited

OTHER PUBLICATIONS

Edwards, ATMs the Hot New Media Buy, ABA Banking Journal, Mar. 1999, pp. 58, 60.
Fickenscher, Amex Prepaid Offering is Latest Card for Firms Regarding Employees, American Banker, vol. 161, No. 151, Aug. 8, 1996, pp. 1-2.
Neumann, An Enhanced Neural Network Technique for Software Risk Analysis, IEEE Transactions on Software Engineering, vol. 28, No. 9, Sep. 1, 2002, pp. 904-912.
Associates First Capital Corporation, Hoover's Inc., The Industry Standard: The Newsmagazine of the Internet Economy, thestandard.net/companies/company-display, Apr. 6, 1999.
Brehl, Banks issue cash-card pledge, The Toronto Star, Oct. 9, 1997, 1 page.
Blockbuster running test of a stored value card, The American Banker, Sep. 1, 1995.
Meece, Boatman's Prepaid Cards for Worker-Incentive Firm, American Banker, Jul. 2, 1996, p. 12.
Boatmen's Floats Stored Value into the Employee Incentive Waters, Debit Card News, vol. 2, Issue 2, Jul. 16, 1996, 3 pages.
CES/NaBANCO introduces stored value card technology blockbuster video is first merchant partner, Business Wire, Inc., Jan. 15, 1996.
CardEx Incentives, www.cardex.com, Apr. 6, 1999.
CardFlash, Apr. 5, 2005.
Vandenengel, Cards on the Internet: Advertising on a $3 Bill, Industry Intelligence, Feb. 1, 1995, pp. 46-48.
Kutler, Cash Card Creator Looking Beyond Mondex, Feb. 9, 1995.
Rosen, Cash Just Isn't Flexible Enough: Shops of the Future Will Only Take Cards, Daily Express, Technology Section, Feb. 10, 1995, 1 page.
Bank, Cash, Check,Charge—What's Next?, Seattle Times, Mar. 6, 1995.
Morgan et al., Categorizing Risks for Risk Ranking, vol. 20, No. 1, Jun. 22, 2005, pp. 49-58.
Common electronic purse specifications, Business Requirements, Version 6.0, Dec. 1998.
Guidotti, Comparing Environmental risks: A Consultative Approach to Setting Priorities at the Community Level, Public Health Rev 1994, vol. 22, Jun. 16, 2005, pp. 321-337.
Britt, Competing in Auto Lending, America's Community Banker, vol. 5, No. 11, Nov. 1, 1996, pp. 33-37.
Consortium created to manage common electronic purse specification, Cardtech Securtech, Chicago, www.visa.com/av/news/PRmisc051199.vhtml, May 11, 1999.
Mobasher et al., Creating Adaptive Web Sites Through Usage-Based Clustering of URLs, Knowledge and Data Engineering Exchange Workshop, Chicago, IL and Los Alamitos, CA, 1999, pp. 19-25.
Lamond, Credit Card Transactions Real World and Online, Paying by Credit Card—Real World and Online, http://www.virtualschool.edu/mon/ElectronicProperty/klamond/credit, printed Jul. 8, 2005, 17 pages.
D.C. Area Safeway Stores Look for Increase in Sales Volume and Revenue with Cards, Card News, vol. 6, No. 25, Dec. 30, 1991, pp. 7-9.
Piskora, Debit Cards Seen Poised for New Markets, American Banker, Credit/Debit/ATMs, Mar. 7, 1995, p. 16.
E-Z Pass, Web page, http://www.ezpass.com-Disc_portNewYork.html, Nov. 12, 2001.
E-Z Pass, Web page, http:\\www.ezpass.com-Disc_ny_annual.html, Nov. 12, 2001.
E-Z Pass, Web page, http:\\www.ezpass.com-frameMain.html, Nov. 12, 2001.
E-Z Pass, Web page, http:\\www.ezpass.com-whatis.html, Nov. 12, 2001.
Business Times, Electronic Purse Can Free You from ATM Drag, Business Times, www.btimes.co.za, printed Feb. 23, 2001, 1 page.
Electronic Purse, SCIA (Smart Card Industry Association), About Smart Cards, www.scia.org, printed Feb. 23, 2001, 1 page.
Sanchez-Klein, Electronic purse alliance planned, Computerworld Online News, Jul. 29, 1998, printed Feb. 23, 2001, 2 pages.
Electronic purse card to be launched tomorrow, New Straits Times, News Clippings, Sep. 18, 1999, printed Feb. 23, 2001, 3 pages.
First Data markets stored-value cards, Cards International, Jan. 30, 1996, p. 5.
First USA—Activate Today and Get One Hour Free Calling Card Calls, Call 1-800-555-2535, First USA, 6 pages, 1997.
First USA—Call 1(800)335-2453 to Receive One Free Hour of Domestic Long Distance Calling (No Strings Attached), First USA, 6 pages, 1998.
First USA Platinum Connect, First USA Bank, First USA Promotional Mailing, Oct. 1997, 6 pages.
First Union Issues Smart Cards to Fort Benning Recruits, CardFax, vol. 1999, No. 60, Mar. 26, 1999, 1 page.
Norris, First data unit develops blockbuster cash card, Omaha World Hearld Sunrise Edition, Business Section, Jan. 19, 1996, p. 16.
Frequently asked questions, ECARD, www.eregard.com, printed Sep. 23, 2001, 7 pages.
Machlis, Have it the smart way: Burger King program drives smartcard use, Computerworld, printed Feb. 23, 2001, 1 page.
Here's the calling convenience you asked for: 1-800-call-ATT . . . For All Calls, AT&T, Appendix A: For Card Carriers, 1999, 7 pages.
Hoovers, General Mills, Inc. Corporate Profile relied upon to show the history of the company, http:/cobrands.hoovers.com/global/cobrands/proquest/history.xhtml?COID=10639, Jul. 12, 2005, 2 pages.
Konrad, IBM Had a Bunch of Unusual Ideas in 2003, www.philly.com, printed Jan. 21, 2004, posted on Jan. 13, 2004, 2 pages.
Incentive Firms Find Debit Cards a Rewarding Experience (Off-line debit card issuers converge efforts with companies looking for effective incentives to boost employee productivity and to motivate individuals to buy their products), Debit Card News, Vol., 1997, 3 pgs.
Coulton, Incentives Field Moving to Card-Based Series 14, American Banker, Mar. 26, 1998, 3 pages.
Introducing SpendingMoney(TM), Armetta: Marketing & Design Product Concept Report, Oct. 9, 1996, 15 pages.
Introducing the First USA Platinum Connect Card, First USA Promotional Mailing, Dec. 1997, 2 pages.
Key Bank Holiday Offer, http://www.key.com/swiftgift/home.html, printed Apr. 5, 1999.
MailFrontier Survey Finds that Consumers Hold Financial Institutions Accountable for Online Identitiy Theft, www.mailfrontier.com, Palo Alto, CA, Nov. 2004.
O'Conner, Maritz Gets MasterCard's Stamp of Approval, Business Travel News, Aug. 19, 1996, 2 pages.
Clark, Microsoft, Visa to Jointly Develop PC Electronic-Shopping Software, The Wall Street Journal, Nov. 9, 1994, WSJ B9.
More Retailers Turn to Co-Branding, Chain Store Age Executive with Shopping Center Age, Feb. 1, 1995, 3 pages.
Bogle, Mutual Funds at the Millennium: Fund Directors and Fund Myths, The Vanguard Group to the '40 Act Institute of PLI (Practicing Law Institute), New York, NY, May 15, 2000, 15 pages.
New 1-800-CALL-ATT Campaign Promotes One Number for All Calls, AT&T Marketing, News Release, www.att.com/press/0297/970217.csa.htm, Feb. 17, 1997, 2 pages.
Schwab, Charles, Now 7 Ways for a better Total Return for Your Money; Schwat 1, The Inventor's Asset Management Account, Charles R. Schwab, Charles Schwab & Co., Inc., 16 pages, 1987.
Dugas, Payroll May Ask: Paper or Plastic?, USA Today, 3B, Aug. 14, 2001, 1 page.
Proton world and Europay to co-operate in creation of new CEPS-compliant e-purse application, Press Release 1999, Waterloo, Belgium, Jun. 28, 1999, 2 pages.
Brown et al., Purchasing Card Magic: Eli Lilly Finds Accounts Payable Flying High With Plastic, Corporate Cashflow, vol. 15, No. 12, Nov. 1994, 2 pages.
Purse Application for Cross Border Use in Euro, Cordis, Pace 1st 1999-11531 Pace, www.cordis.lu, printed Feb. 23, 2001, 3 pages.
SK100 Smart Card Electronic Purse Balance Reader, SK100 Balance Reader, http://perso.wanadoo.fr, printed Feb. 23, 2001, 1 page.
Miller, Section E.2.1: Kerberos Authentication and Authorization System, Project Athena, Cambridge, MA, Dec. 21, 1987, 39 pages.

(56) References Cited

OTHER PUBLICATIONS

Souccar, Smart Cards: 1st Union Smart Card Pilot Enlists a Second Army Base, American Banker, Digital Frontiers, vol. 164, No. 61, Mar. 31, 1999, 3 pages.
Smart Cards: Big Brother's Little Helpers, The Privacy Committee of New South Wales, No. 66, Aug. 1995.
Smart card for loyalty and e-purse applications eclipses capability of conventional mag-stripe cards, Press Release, www.1.sib.com, Apr. 21, 1997, printed Feb. 23, 2001, 3 pages.
SmartAxis: Load Cash on to your E-Purse Card, Supported Currencies and Schemes, www.smartaxis.co.uk, printed Feb. 23, 2001, 9 pages.
Spurgin, Sopininmon! or What's Happening in the Retail Credit Card Environment, Credit World Journal, vol. 85, No. 4, Mar. 1, 1997, pp. 20-23.
Lacker, Stored Value Cards: Costly Private Substitutions for Government Currency, Economic Quarterly, 1996, Economic Quarterly, v82, n3, p. 1(25), ISSN: 1069-7225, 17 pages.
Lazarony, Stuck for a gift? Give a prepaid credit card, www.bankrate.com, Dec. 21, 1998, 1 page.
Key, Swift Gift 'Wows' Internet Shoppers, PR Newswire, www.key.com/swiftgift/home.html, Dec. 2, 1998, 1 page.
The Campus Card Conundrum, Card Technology, Journal ISSN: 1093-1279, p. 25+, Feb. 1998, pp. 1-8.
The Electronic Purse Reaches the Car Park, http:\\docs.vircom.net/mobility/parking, printed Feb. 23, 2001, 2 pages.
The Evolution of a New Consumerism, Chain Store Age, vol. 73, Jun. 1997, pp. 8-9.
Stoughton, The Gift of Credit, www.washingtonpost.com/wp-srv/business, Dec. 14, 1998.
Stuber, The electronic purse: An overview of recent development and issues, Bank of Canada, Technical Report No. 74, www.bankofcanada.ca, Jan. 1996, printed Feb. 23, 2001, 2 pages.
Understanding the benefits: Smartcity offers a number of important benefits to both the card issuers and their customers, http://www.icl.com/smartcards/benefits.htm, printed Feb. 27, 2001, 2 pages.
Langheinrich et al., Unintrusive Customization Techniques for Web Advertising, Computer Networks, vol. 31, 1999, pp. 1259-1272.
Universal Card free lifetime membership extended 3 months, AT&T Marketing, www.att.com/press/0297/970217.csa.html, Dec. 4, 1990, 2 pages.
Visa Cash—Where can I get it?, www.visa-asia.com/pd/cash/where.html, Feb. 23, 2001.
Visa Cash, www.visa-asia.com/pd/cash/main.html, Feb. 23, 2001.
Visa International and SERMEPA Announce Plans for Cross Border Visa Cash Based on CEPS, www.visa.com/av/news/praaamisc111699.vhtml, Nov. 16, 1999.
Visa first to launch electronic purse load via GSM mobile phone, www.cellular.co.za, Johannesburg, ZA, printed Feb. 23, 2001, 4 pages.
Visa releases visa cash electronic purse specifications based on CEPS, www.visa.com/av/news/PRaamisc042099.vhtml, San Francisco, Apr. 20, 1999.
Hansell, Visa to unveil electronic purse cards, New York Times, printed Feb. 23, 2001, 2 pages.
Welcome to Card Express CardEx, CardEx website archived by web.archive on Oct. 31, 1996, http://web.archive.org/web/*/http://www.cardex.com, retrieve Oct. 18, 2003, 7 pages.
Welcome to Card Express, The CardEx Incentive Card, as disclosed in the CardEx web site archived by web.archive.org on Feb. 7, 1998, http://web.archive.org/web/*/http://www.cardex.com, retrieve Oct. 18, 2003, 8 pages.
Swiftgift, Welcome to Swiftgift, www.swiftgiftcard.com, Dec. 8, 1998, 10 pages.
Machlis et al., Will smart cards replace ATMs?, Computerworld, printed Feb. 23, 2001, 3 pages.

\* cited by examiner

STORED VALUE CARD PROVIDED WITH MERCHANDISE AS REBATE

FIELD OF THE INVENTION

The present invention relates to a system and method for providing a stored value account to a customer as a rebate for a purchase transaction.

BACKGROUND OF THE INVENTION

To obtain a rebate in traditional rebate systems, consumers may fill out a paper rebate form, cut out a product UPC symbol, and mail the form, the UPC symbol, and an original or copy of a receipt to a central clearinghouse. After several weeks or months of processing, a rebate check may be sent to qualifying consumers.

Conventional paper-based rebate fulfillment system have many disadvantages. Customers often do not receive their rebate checks until many billing cycles after the time of purchase. Additional delays include depositing and processing the rebate check, which is often a very small amount. Small mistakes such as failing to include an original copy (or photocopy) of a product receipt or postmarking the rebate submission a day after the deadline typically result in forfeiture of any rebate. Although retailers intend for consumers to make purchasing decisions based on the "effective" price of an item after rebate, tight budgets, time delays, and fulfillment uncertainty diminish the intended effect of the rebate incentive. Also, many consumers deem these time and administrate costs more hassle than they are worth, particularly for small rebates. In fact, for traditional paper-based systems offering rebates over $10, many consumers do not redeem rebates: 10% of consumers fail to submit rebate forms; 2-3% of submitted rebate forms are rejected or are otherwise invalid; and 3-5% of rebate checks are not cashed. In sum, around 15% of those eligible for rebates in excess of $10 do not redeem their value.

In addition, rebate providers also incur significant time and labor costs in administering the rebate award. Finally, although rebate submissions typically require proof of purchase and personal information, a separate submission is required for product registration. Because traditional rebates, product registration, warranties, and return policies often require the exact same items for fulfillment—e.g., original receipts and original product UPC codes—consumers often must choose between a rebate and warranty protection. Although copies of UPC codes and receipts are sometimes permitted, the process of obtaining copies is yet another hurdle in the rebate fulfillment process.

Other rebates may be issued as stored value cards. Although stored value cards may be issued as a rebate, stored value cards and accounts are typically purchased or otherwise funded directly by a consumer. For example, prepaid phone cards and debit cards enable users to preload value to an account associated with a card and account number, where the card and/or account number is usable to redeem the stored minutes or monetary value for long distance communication service or make purchases at merchant debit card terminals. Rebate-funded stored value cards include the Disney™ card issued by Bank One™, which allows users of a Disney™ credit card to earn "Disney dollars" as a rebate for purchases made using the credit card. Once the Disney™ credit cardholder earns enough Disney™ dollars, the cardholder is issued a Disney™ stored value card that stores the Disney™ dollars. The Disney™ dollars are usable at Disney™ locations for Disney™ products.

Similarly, U.S. Pat. No. 6,615,189 discloses a system wherein credit cardholders earn a rebate on credit card purchases in the form of a stored value card issued to the cardholder. However, traditional methods of issuing a stored value card as a rebate require the user to have a pre-existing relationship with the issuer. Traditional methods also typically require the rebate-funded stored value card to be issued and/or activated independent of any consumer behavior, thereby adding uncertainty to the redemption process while adding additional time and administrative costs to all parties.

These and other drawbacks exist with current systems and methods.

SUMMARY OF THE INVENTION

Accordingly, various embodiments of the present inventions may be directed to a system and method for creating a stored value account based on a purchase transaction. An indicia of an identifier is passed to a customer at a point of sale as a result of a purchase. A request to activate a stored value account associated with the identifier is received from the customer, wherein the request comprises the identifier. The stored value account is activated by a computer processor. The stored value account comprises information about a rebate value that is associated with the purchase and usable by the customer.

According to another embodiment, a system for creating a stored value account based on a purchase transaction is provided. A distribution module outputs an indicia of an identifier to be distributed to a customer at a point of sale in a purchase transaction. A request receiving module receives from the customer a request to activate a stored value account associated with the identifier, wherein the request comprises the identifier. An activation module activates the stored value account by a computer processor, wherein the stored value account comprises information about the customer's name, a rebate value that is associated with the purchase transaction and usable by the customer, and an account number.

According to another embodiment, a computer-readable medium encoded with computer program code to create a stored value card account as a rebate based on a purchase is provided. The program code is effective to pass an indicia of an identifier to be distributed to a customer at a point of sale in a purchase transaction. The program code is also effective to receive from the customer a request to activate a stored value account associated with the identifier, wherein the request comprises the identifier. The program code is also effective to activate the stored value account, wherein the stored value account comprises information about the customer's name, a rebate value that is associated with the purchase transaction and usable by the customer, and an account number.

According to another embodiment, a computer implemented method for creating a stored value account based on a purchase transaction is provided. An account access device to be distributed to a customer at a point of sale of a purchase of a product or service is passed, wherein the account access device comprises an identifier and instructions about activating a stored value account associated with the identifier. A request to activate a stored value account is received from the customer, wherein the request comprises the identifier. The customer is prompted for personal information of the customer, the identifier, and purchase information. Personal information of the customer, the identifier, and purchase information is received from the customer. The product or service is registered based on the receipt of the personal information, the identifier, and the purchase information. The stored value account is activated by a computer processor based on the receipt of the personal information, the identifier, and the purchase information. The stored value account stores a rebate value based on the purchase, wherein the rebate value is usable for one or more purchases on a transaction network, wherein the access device is usable to access the stored value account. The stored value account comprises information about the customer, a stored value account number, and the rebate value.

Other embodiments are also within the scope of the invention.

DETAILED DESCRIPTION OF EXEMPLARY EMBODIMENTS

Figure 1:
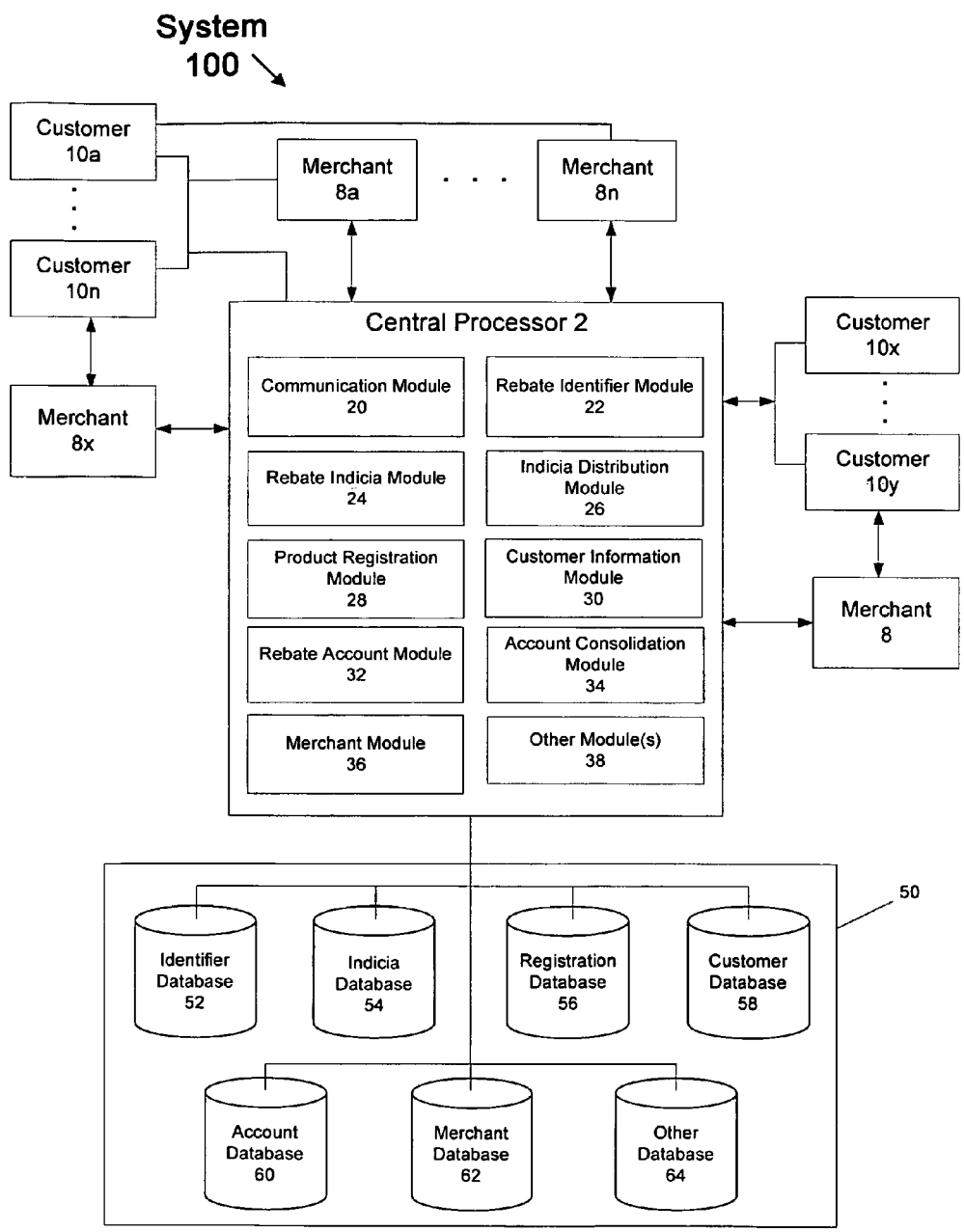
FIG. 1 depicts a system for creating a stored value account based on a purchase transaction according to an embodiment of the invention.

The embodiments described herein solve many problems with existing systems and methods. In some embodiments, a rebate card or indicia of a rebate account is provided to a customer together with a product. For instance, a product purchased by a customer may include in its packaging the rebate card or indicia. Rebate redemption instructions may be provided with the card, product, or packaging, or instructions may be provided on a website. The customer may then activate the rebate account according to the redemption instructions. Activation may occur in real time. For instance, the customer may log onto a designated website and enter the rebate identifier and/or register the product. The customer may also enter product registration information such as personal information, merchant information, and product purchase information. The rebate account may be activated immediately upon registration.

A rebate account such as a debit card account or other stored value card account may be created, loaded, and activated, e.g., upon registration of a purchased product. (It should be appreciated that the rebate account may or may not have an access device such as a card, RFID, biometric device, or other device.) The rebate account may also be activated (e.g., and the product may be registered) immediately at the point of sale, e.g., at a merchant terminal or via the Internet for an online purchase. The customer may then use the funds stored in the rebate account. For instance, the card may be used within the parameters of the rebate program. For instance, the customer may use an account number associated with the rebate account to make an online purchase, or the customer may use the rebate card like a regular debit card at merchant terminals. In some embodiments, the card may be usable: with a designated merchant (e.g., a merchant associated with the central processor 2) or set of merchants (e.g., a certain type of merchants or a certain exclusion of merchants such as supermarkets and gas stations); for purchases of a specific type of product; for Internet-only purchases; or anywhere VISA or another card brand is accepted. The value of the rebate may depend on rebate program factors such as time of purchase/activation, retailer, etc. For instance, a greater rebate may be offered during the first three months of product release.

The card may have a card number printed on it, although in some embodiments the card may not have a PIN or other security mechanism. The card may operate in a manner similar to other debit cards that work on a proprietary or national network (e.g., VISA).

The card account may be linked to the product registrant (e.g., the customer). Thus, account activity by a particular consumer can be tracked. A central database may also store information linking each card with a particular product, merchant, store location, etc.

In some embodiments, a plurality of rebate accounts or other accounts may be consolidated or associated with one another. The funds from multiple rebate accounts may be consolidated into a single stored value account, such as a stored value account with a particular merchant, manufacturer, or other entity. In some embodiments, accounts may be linked such that account information and/or funds may be accessed or shared among the accounts. In some embodiments, one or more accounts may be designated as subordinate to others. For instance, a rebate accountholder may earn another rebate and designate the second rebate account to be subordinate to the first. The accountholder may place restrictions on the account, such as by limiting the merchants or locations who may redeem funds from the account, and the account may be provided to another, such as a child of the accountholder.

In other embodiments, a single account may be divided into more than one account. One or more of the accounts may be linked to another account (e.g., as a subordinate account).

Various embodiments of the rebate card of the present invention have several advantages over the prior art mail-in-rebate system. The consumer may receive the rebate without spending the time, effort, and postage required in the traditional mail-in paper rebate system. Consumers may gain access to rebate funds instantaneously rather than several months later, and consequently there is less uncertainty about eventual rebate fulfillment. Consumers may thereby benefit because they are more likely to actually receive rebate dollars, and their general confidence in such rebate systems will increase. While around 15% of those eligible for rebates in excess of $10 do not redeem their value, it is estimated that around 99-100% of those receiving rebate cards according to an embodiment of the present invention will activate the value on the cards.

In some embodiments, manufacturers, retailers, rebate issuers, or other entities may provide conditions that govern usage of rebate funds. For instance, a merchant may specify that a rebate for one item may be used for the purchase of another specific item or class of items related to the purchase of the one item. As an example, a manufacturer may specify that a rebate (e.g., a stored value account having a funding value of $15) for a purchase of a digital camera may be used only for the purchase of an accessory for the camera.

In some embodiments, a list of qualifying accessories may be provided together with the account information of the rebate account, and the list may comprise one or more specific camera straps, one or more memory cards formatted to fit the camera, and one or more sets of rechargeable camera batteries. In some embodiments, a rebate from one manufacturer may only be used toward the purchase of other items from the same manufacturer. For instance, the purchase of an ACME-brand wallet may only be used toward the purchase of other ACME-branded products. The account may also provide instructions for purchasing one or more of the list of qualifying items. For instance, an account website may provide links (e.g., product links) to websites that sell the qualifying accessory. In some embodiments, the rebate may comprise a coupon for the purchase of one or more specific items. For instance, a rebate for the purchase of a digital camera may comprise a PIN or code usable to redeem a specific accessory, such as a camera strap.

In other embodiments, a retailer may specify that the rebate may only be used in the retail store for designated items such as items of the same brand or manufacturer (e.g., items having a SKU indicating they are from the same brand or manufacturer). Thus, a consumer may purchase an item, receive a rebate card (e.g., inside the product packaging or received from the merchant at time of purchase), and then use the rebate card toward a qualifying item.

In some embodiments, a rebate card may have conditions on the timing or other characteristics of its use. For instance, a rebate card may provide $10 of value each month towards the purchase of a particular type of item (or any purchase). A rebate card account may also receive various offers and promotions, such as 20% off on purchases from a particular website, manufacturer, or product class. Other benefits may be conferred via the rebate card.

In some embodiments, the consumer may register the product as part of the rebate activation process rather than submitting separate rebate and product registration forms. Furthermore, because some embodiments do not require the consumer to submit original UPC codes or receipts, consumers may obtain a rebate without sacrificing product registration, warranty, and benefits of product ownership.

The rebate account may also enable the accountholder to redeem the coupon for cash or other items or value, instead. For instance, the customer may choose between redeeming the rebate for a camera strap, redeeming the rebate for a $15 stored value account usable towards a purchase from the same manufacturer, redeeming the rebate for a $10 stored value account usable towards any purchase, or redeeming the rebate for an $8 check delivered via regular mail.

In some embodiments, the rebate provider may also enjoy several benefits over prior systems. A rebate card system may reduce the operational and administrative costs associated with rebate program management. By integrating the rebate with product registration, the rebate provider may obtain more information about the consumer than that provided in prior rebate systems, which typically only involve a consumer's name and address. The rebate card may also create an ongoing relationship between the rebate provider and the consumer, enabling the rebate provider to strengthen its relationship with the consumer, e.g., through card-related communications and increased brand awareness.

Overview and System Illustration

According to one exemplary embodiment as depicted in FIG. 1, a system 100 for issuing a stored value card as a rebate is provided.

The central processor 2 may communicate with one or more customers 10a-10n and one or more merchants 12a-12n. The central processor 2 may be coupled to a database 50.

The database 50 may store information, such as information received from the central processor 2, financial institution 12, customer 10, and credit bureau 12. The database 50 may be part of the central processor 2 or it may be coupled to the central processor 2. The database 50 may comprise a plurality of databases 60-68.

Customers 10 may comprise current or potential customers of merchants 12 and/or central processor 2. The customers 10 may be persons, businesses (e.g., small businesses), or other entities. For instance, a customer 10a may be an individual person (or other entity such as a corporation) who has received an indicia of a rebate account identifier, e.g., by purchasing a product containing the indicia.

The database 50 may comprise a plurality of databases 52-66.

Identifier database 52 may store information associated with one or more identifiers and/or rebate accounts. For instance, identifier database 52 may store information associating a particular identifier or rebate account with other information, such as a specific product or store location. Identifier database 52 may also store information about the status of any rebate account or identifier, e.g., whether the account is in a "ready to be activated account" or an "inactive" or "invalid" state.

Indicia database 54 may store information about an indicia of an identifier associated with a rebate account. For instance, indicia database 54 may store information associating a specific product or store location with a particular indicia. In embodiments where an indicia comprises a stored value card, indicia database may store stored value card account information.

Registration database 56 may store product registration information, such as information received from a customer during product registration. This information may comprise customer information, merchant information, purchase information, and other information associated with the product, purchase, or purchaser.

Customer database 58 may store information about the customer 10, including personal information and information about any transactions associated with a customer's 10 rebate account. As used herein, the term "customer" shall refer to a customer 10 of a merchant 12.

The customer information may be provided by and received from a customer 10, or it may be obtained from merchants 12. The customer information may comprise personal information or any other information that relates to the customer. Customer 10 information may comprise any of the following types of information: name, address, email address, static Internet IP address, birth date, social security number, credit score, income, job status, time at current residence, past residence information, user id, password, PIN, accounts, associated offers, associated financial or other products, and other personal or financial information. For instance, the customer information for a particular customer may be associated with one or more particular accounts, such as any accounts provided by the bank for the customer (or accounts provided by competing banks or other financial institutions). Customer information may also comprise personal preference information and purchase history information.

Account database 60 may store account information, including information about any transaction made using a rebate account. For instance, account database 60 may store any of the following information about a transaction made using a rebate account: transaction location, transaction date and time, type of product or service purchased, information identifying the product or service purchased, name of purchaser, name of rebate accountholder, and other information associated with account activity. Account database 60 may also store information about any accounts associated with a rebate account, such as a subordinate account or consolidated account.

Account information may comprise any information related to a rebate account or other account associated with a rebate account, such as a checking account, DDA account, credit card account, prepaid account, debit account, savings account, investment account, business account (e.g., small business account), stored value card account, or other financial account. Account information may comprise any of the following, for example: accountholder name, accountholder address, mother's maiden name, persons authorized to use the account, accountholder user id, accountholder password, account identification data, associated card number, routing number, balance, transaction history, bill payment information, and other account data.

Merchant database 62 may store information about any merchants 62. For instance, merchant database 62 may store information about merchants 12 that sell products associated with rebate indicia and merchants 12 that sell products or services to customers 10 in exchange for rebate account value.

Other database(s) may store other information related to rebate accounts, identifiers, indicia, customers 10, and merchants 12.

It should be understood that each of the plurality of databases 50-68 may store information linked to information in other databases 50-64.

The central processor 2 may comprise a processor, server, hub, intranet, voice response unit (VRU), computer, network, banking system, and/or other processing element. Preferably, the central processor 2 comprises a rebate processing center, a financial institution such as a bank, or a computer or computer system associated with a merchant. For instance, the central processor 2 may comprise a rebate account computer system. The processor 2 may also comprise a computer system that handles the enrollment and maintenance of rebate accounts such as stored value card accounts. The processor 2 may comprise input and output devices for communicating with database 50, customers 10, and merchants 12.

The central processor 2 may comprise a plurality of modules 22-38. Each module may comprise a computer or other processor, including one or more input and output devices. The processor 2 may accordingly be a system comprising a plurality of computer systems linked together on a network.

The communication module 20 may comprise one or more communication devices or systems configured to communicate with one or more persons (e.g., customers 10), one or more merchants 12, and one or more other systems or networks (e.g., a bank computer system or bank internet site). The communication module 20 may comprise an automated telephone system such as a voice response unit ("VRU"). The communication module 20 may also comprise a server or other processor or computer that may communicate over the Internet or via other networked communication (e.g., intranet, extranet, etc.). For instance, the communication module 20 may host an Internet site associated with the processor 2, such as a rebate redemption website. The communication module 22 may also comprise live agents who may speak with customers 10 and other entities.

The communication module 20 may perform any of the following functions: receive customer 10 phone calls; prompt customers 10 for customer information; receive customer 10 information, e.g., over the Internet; receive merchant information, such as product purchase information; and pass information to the processor 2 and/or to one or more merchants 12. The communication module 22 may receive information (e.g., customer information such as a rebate identifier) at a website (or otherwise over the Internet or via online communication), over the phone, via email, text messaging, via VOIP, a direct data connection, or other means.

For instance, a communication module 20 associated with one financial institution may prompt a customer 10 for a rebate identifier and product registration information. It may also prompt a customer for account access information (e.g., a user id, password, account number, etc.) of an existing rebate account.

Communication module 20 may also communicate offers and promotions, e.g., based on consumer behavior such as transactions involving the rebate account. The communication module 22 may store information, such as account access information, in a database 50, such as account database 60.

Rebate identifier module 22 may process rebate identifier information. A rebate identifier may be operative to activate and/or access a rebate account. For instance, rebate identifier module 22 may associate one or more identifiers with one or more rebate accounts. The identifier may comprise any account number, password, code, PIN, name, or other identifier that may be used to identify a specific rebate account. In some embodiments, the identifier may comprise a sixteen-digit number that may be associated with an account and/or may be usable to access funds over a transaction network. For instance, an identifier may comprise an account number printed on a stored value card distributed with a product.

Rebate identifier module 22 may also associate together any of the following: a rebate identifier; a rebate account number; a rebate account; a specific product or type of product (e.g., by SKU, barcode, UPC, or other product identifier); an amount (e.g., a dollar amount of a rebate account); and a merchant (e.g., a merchant who distributes a specific product containing a rebate indicia). For instance, rebate identifier module 22 may associate a rebate identifier with a particular UPC code, dollar amount, and rebate account number, such that a rebate account having the rebate account number will be created with the designated monetary amount if a activates a rebate using the particular UPC. Information processed by module 22 may be stored in identifier database 52.

Rebate identifier module 22 may also determine whether a product associated with an identifier has been purchased. In some embodiments, a rebate account associated with a particular identifier may not be activated unless a product associated with the identifier has been validly purchased, e.g., at a retailer associated with the identifier or otherwise authorized retailer.

Rebate indicia module 24 may generate indicia of a rebate identifier as well as indicia of other rebate-related information, such as images and graphics. For instance, rebate indicia module 24 may comprise a printer for printing identifiers or other rebate-related information on a coupon or product packaging of a product, e.g., a product associated with the identifier. Rebate indicia module 24 may also associate images or graphics such as runes and symbols with an identifier or account. Information about the image may be received as a condition of rebate account activation.

Indicia distribution module 26 may distribute one or more identifiers (or indicia of one or more identifiers) to one or more merchants 12 and/or one or more customers 10. For instance, a product may be distributed to a customer. Indicia distribution module 26 may cause indicia to be included with or otherwise coupled to a particular product that may be distributed to a customer 10 directly, or indirectly via a merchant 12.

Indicia distribution module 26 may comprise an output apparatus for passing indicia to customers 10 and merchants 12. For instance, indicia distribution module 26 may comprise a printer to print indicia of an identifier on a product, product package, or other item included with a product such as a retail product. In some embodiments, the indicia may comprise a card associated with an account, such as a debit card or other card linked to an account.

Indicia distribution module 26 may also distribute instructions for redeeming a rebate (e.g., by activating a rebate account). These instructions may be provided with (or be part of) the indicia. For instance, indicia distribution module 26 may print instructions on a stored value card indicia, wherein the instructions instruct a customer 10 to access a particular website (e.g., www.rebate.com) to redeem the rebate. Customers may receive the instructions on the indicia and follow the directions to activate the account, such as by accessing a particular website and providing customer information, product information, and purchase information, such as an identifier provided on an indicia.

Product registration module 28 may receive and process product registration information, such as product information, merchant information, purchase information, and customer information. Product information may comprise information about a product, such as a make and model number, SKU, barcode number, UPC code, or other identifier. Merchant information may comprise any information about a merchant 8, such as the name, address, location, location code, store number, or other information identifying the merchant 8 (e.g., the merchant 8*a* where a particular product was purchased and/or where a particular indicia was obtained). Purchase information may comprise information about the purchase of a product, such as the date of purchase, purchase price, any other discounts or promotions associated with the purchase (e.g., a rebate), and customer 10 information.

In some embodiments, product registration module 28 may prompt for and receive product registration information from a customer 10 and register a product, e.g., a product for which a customer 10 seeks a rebate. Product registration module 28 may store product registration-related information in the registration database 56.

Customer information module 30 may prompt for, receive, process, and store customer 10 information, e.g., in customer database 58. Customer information may be received when a customer 10 registers a product and/or requests a rebate. Customer information may comprise any of the following information related to the customer: name; address; address history; email address; social security number; mother's maiden name; income; other account information (e.g., information about a checking or savings account); rent or mortgage information; employment history; current employment status; credit score (or other credit data); work address; home, work, and/or mobile phone number; Internet accessibility information; date of birth; number of dependents; and/or other customer information. Customer information may also comprise customer preference and behavior information, such as credit card purchase activity.

Rebate account module 32 may prompt for, process, and store rebate-related information. Rebate-related information may be stored in the account database 60.

Rebate account module 32 may create or modify one or more accounts. Rebate account module 32 may open or activate an account for a customer, e.g., a rebate account associated with a purchased product. Rebate account module 32 may also modify an existing account, such as an existing rebate account. For instance, rebate account module 32 may add an additional customer 10*b* to a customer's 10*a* existing account, such that the additional customer 10*b* may access value stored in the account. Rebate account module 32 may accordingly receive account information from a customer, such as personal and financial information. Account creation module may also determine account information, such as account number, statement dates, expiration date, minimum balance, interest rate, fees, and other account information well-known in the art.

Rebate account module 32 may also manage account funds and information. For instance, rebate account module 32 may transfer funds to merchants 12, e.g., during a customer 10 purchase from the merchant 12 using rebate funds. Rebate account module 32 may determine an expiration date for the stored value card account (and/or associated card). For instance, the expiration date may be based on the date of activation or product registration, e.g., six months after activation. Rebate account module 32 may also handle other account servicing needs. For instance, if a stored value card associated with the rebate account was not previously provided to customer (or it was lost or stolen), then rebate account module 32 may create such a card (e.g., with a different account number) and pass it to the customer. Rebate account module 32 may store information about any transactions associated with the rebate account.

Rebate account module 32 may also manage the value of the account. For instance, the value (e.g., initial activation value) may be variable depending on circumstances of the customer, product, purchase, or other conditions. For instance, the amount of the rebate may depend on the time of purchase. A rebate of one amount may be provided before a certain date of purchase (or registration), and a different amount may be provided if an item is purchased during a second period of time; yet another amount may be provided if the product is purchased after a third date, for example. In some embodiments, the amount might decrease over time and/or eventually become zero (or a very small amount), e.g., if the item becomes a clearance sale item or is otherwise offered for sale or sold at a substantial discount from its original price or MSRP. In some embodiments where the amount drops to zero, systems and methods described herein may still be used to receive customer information and/or register a product. Also, different rebate values or amounts may be provided to senior citizens, students, or repeat customers. For instance, a particular type of rebate value may be provided only once per different customer, such that a customer attempting to activate two of the rebates would only be provided with the specific rebate value once.

The rebate value may also vary with time or other conditions after activation of the rebate account. For instance, the rebate account may be automatically reloaded every month or year in an amount of $10, e.g., usable for purchases from a specific manufacturer or retailer. In some embodiments, the rebate account may be provided with 10% off coupons for a different product every month and receive other promotional values.

Account consolidation module 34 may consolidate, divide, or otherwise amend a rebate account. For instance, account consolidation module 34 may transfer some or all of the funds from one rebate account to another rebate account or other account such as a checking account. Account consolidation module 34 may determine any of the following information with respect to an account consolidation or division: destination account, destination routing number, transaction summary information, and any other information related to a transaction. For instance, the fund transfer module 32 may cause $50 to be transferred from a customer's rebate account to a customer's account with an online merchant.

Account consolidation module 34 may consolidate or divide one or more rebate accounts. For instance, a single customer 10 may accrue a plurality of rebates by purchasing a plurality of items with associated rebates. Instead of using the funds from the different rebate accounts separately, the customer 10 may request the account consolidation module 34 to consolidate the rebate value (e.g., the remaining balance) from the different accounts into a single account. It should be appreciated that account consolidation module 34 may allot value from one or more different accounts into one or more of the same or different accounts in any chosen value distribution. For instance, it may divide one rebate account having a $100 balance into three accounts having $10, $20, and $70, respectively.

Account consolidation module 34 may also create terms and conditions associated with any created or amended accounts, e.g., as designated by the customer 10. For instance, a parent customer 10a may create a subordinate account for a child 10b, wherein the child may only use the value of the subordinate account at a specific set of merchants such as toy stores. Account activity of the subordinate account may be reported to the owner of the dominant account (e.g., parent customer 10a).

Account consolidation module 34 may also allot value of one or more accounts for a plurality of different customers 10. For instance, a plurality of customers 10 may pool their accounts into a single account. They may collectively pool a plurality of rebate awards for a single redemption. For instance, pursuant to the terms of a specific rebate promotional reward, ten rebates on the purchases of ten baseball gloves may earn a baseball bat. As each of ten individuals purchases a baseball glove and redeems the rebate, the rebate for that account may be pooled to another account. When ten rebates are accumulated, a baseball bat (or a voucher for a bat) may be sent to a customer 10 associated with the pooled account. Other methods of rebate fulfillment may be contemplated herein.

Merchant module 36 may process information associated with purchases from merchants 12 (e.g., purchases made by customers 10 at merchants 12 using a rebate account) and other merchant-related information. In particular, merchant module 36 may receive information from merchants 12 confirming the purchase of a product associated with a rebate account. For instance, merchant module 36 may receive a product identification number or serial number identifying the product. Merchant module 36 may also receive information identifying the purchaser and other information associated with the purchase. Based on this information, merchant module 36 may determine that a particular rebate account is ready to be activated. Merchant module 36 may then store this information in identifier database 52, e.g., by showing the identifier associated with the rebate account to be in a "ready for activation" status. In some embodiments, a rebate account may not be activated until the central processor receives confirmation (e.g., from the customer 10 or from a merchant 12) that an associated product was validly sold.

Merchant module 36 may also receive information about returns or other information about an item associated with a rebate account. Thus, in some embodiments, the rebate account also may not be activated if a product has been sold but then returned by the purchasing customer 10. For instance, if a customer 10 returns a product associated with a rebate before activating a rebate account, merchant module 36 may determine that the rebate account (or its associated identifier) is "invalid" or "unready for activation." The merchant module 36 may refuse to activate the rebate account if the customer 10 later attempts to do so. If a rebate account has already been activated, the rebate account may be cancelled, or the customer 10 may be denied access to the account.

Merchant module 36 may also communicate with merchants 12 regarding the redemption of a rebate (e.g., the activation of a rebate account). For instance, when a customer 10 activates a rebate account or otherwise redeems a rebate associated with a specific product, merchant module 36 may pass information identifying the specific item to a merchant 12 associated with the item (e.g., the merchant 12 who sold the item). If the same customer 10 later attempts to return the item for a refund, the merchant 12 may require the customer 10 to return rebate funds, such as all of the rebate funds or a portion thereof (such as the used portion), or the customer 10 may be refunded the purchase price minus the value of the rebate (e.g., the used portion of the rebate).

Other module(s) 38 may perform other functions.

It should be appreciated that the modules 20-38 may access and store information in the databases 50-64. It should also be understood that the central processor 2 and modules described herein may perform their described functions automatically or via an automated system. As used herein, the term "automatically" refers to an action being performed by any machine-executable process, e.g., a process that does not require human intervention or input.

Illustrative Process

Figure 2:
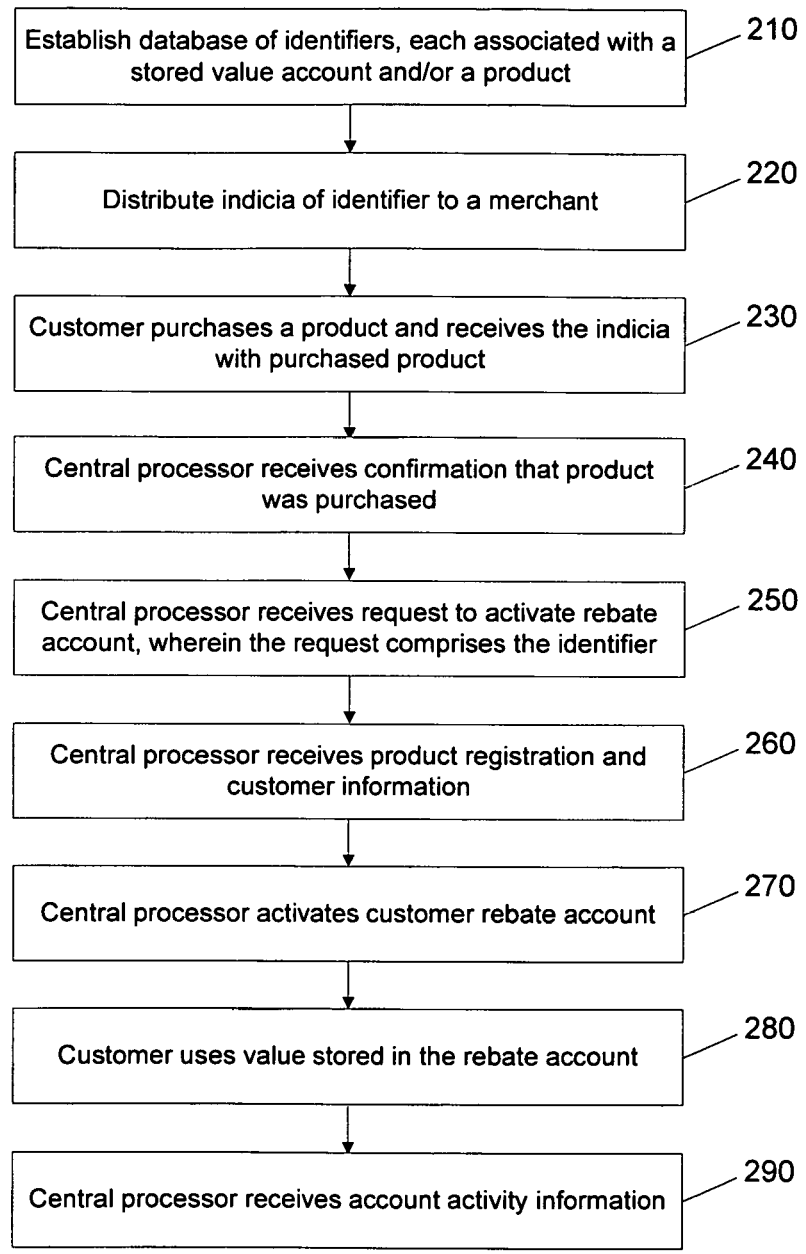
FIG. 2 depicts a method for creating a stored value account based on a purchase transaction according to an embodiment of the invention.

FIG. 2 depicts a method for creating a stored value account based on a purchase transaction according to an embodiment of the invention.

In block 210, a database of identifiers may be established. Each identifier may be associated in the database with a stored value account, a product or service, a product or service identifier, a merchant, a merchant location, rebate fulfillment instructions, expiration date, account number, and other information. For instance, a database entry of a particular identifier comprising a sixteen-digit rebate account number may be associated with a specific retailer and product UPC code.

In block 220, indicia of an identifier may be distributed to a merchant. For instance, an indicia of the account number identifier may be a stored value card having the account number and a magnetic stripe with the account number encoded on it. The debit card may be distributed to a merchant. For instance, the stored value card may be included inside the packaging of the product distributed to the merchant. The merchant may stock the product in a merchant store for sale to customers.

In some embodiments, the identifier may be a PIN number printed on a receipt at the point of sale. In other embodiments, the identifier may be comprised on an indicia such as a coupon separate from the product. The coupon or other separate indicia may be provided to the customer at or near the time that the customer purchases a product. In other embodiments, the identifier may comprise a product identifier such as a SKU, UPC code, or serial number. The product packaging that displays the serial number or other identifier may accordingly be the indicia of the identifier. Preferably, the identifier may comprise a unique number that may be associated with a single specific rebate account. In still other embodiments, an identifier may be displayed to the customer, e.g., on a display screen or on a website.

In some embodiments, a security measures may be taken to prevent unauthorized access to the rebate account or rebate account information. For instance, a security device may physically cover the display of a rebate identifier (such as a rebate card account number or PIN). The security device may comprise a scratch-off material, foil, or other covering. Such embodiments may be particularly useful if the rebate identifier would be otherwise visible to a customer, such as if the identifier is printed on the outside of a product's packaging or box but inside a protective clear plastic shrinkwrap. After purchase, a customer may scratch off or otherwise remove the security material in order to view the card number. A customer who purchases the item may also know by looking at the rebate card whether the card has already been activated or otherwise used.

In block 230, a customer may receive the indicia, e.g., as a result of a purchase transaction, such as the purchase of a product or service. For instance, the customer may receive the indicia when the customer purchases the product or service associated with the identifier (or account). For instance, the customer may purchase a digital camera that has a stored value card inside the packaging. In another embodiment, the customer may purchase a concert ticket, wherein a PIN number is printed on the receipt for the ticket.

In block 240, the central processor may receive confirmation that the transaction of block 230 took place. For instance, the central processor may receive confirmation from the merchant that a product associated with a specific identifier was validly purchased. The central processor may also receive any other information relating to this product, such as if the product is eventually returned by the customer for warranty service, an exchange, or a refund.

The central processor may update the database entry of the identifier based on this confirmation. For instance, the central processor may indicate that an account associated with the identifier is "ready for activation."

In some embodiments, an authorization code (e.g., a PIN) that indicates a proper sale may be provided upon purchase (e.g., by printing it on the product receipt). This authorization code may comprise confirmation that a proper sale took place. Thus, in some embodiments, the rebate may be activated after verifying the authorization code.

In block 250, the central processor may receive a request to activate a rebate account. The request may comprise the identifier. To make the request, the customer may perform instructions for rebate fulfillment provided with the purchased product and/or the indicia. For instance, the customer may access a website specified in instructions taped to the back of a stored value card provided with a product. The website may prompt the customer for the account number of the stored value card. The instructions may also provide instructions about how to access the Internet (or pursue other activation means) if Internet access is not readily available.

In some embodiments, the rebate may be activated after receiving personal information, product information, and/or purchase information. For instance, the product may be registered as a condition of activating the rebate account.

In block 260, the central processor may receive other information, such as personal customer information, transaction information, rebate activation information, and product information. For instance, the central processor may receive product registration information and register the product.

In some embodiments, the central processor may be the manufacturer of the product. The central processor may accordingly handle any warranty, repair, customer input, user forums, and other information and communications relating to the product or servicing the product.

In block 270, the central processor may activate the stored value account (e.g., a rebate account). For instance, value may be loaded into the account in an amount equal to a rebate value. Upon activation, that value may become usable by the customer. For instance, if a $10 rebate was advertised for the purchase of a particular product purchased by the customer, the corresponding rebate account may be loaded with $10 of value. In some embodiments, the rebate may be determined based on a purchase price, e.g., a purchase price of a product that includes an indicia of the stored value account. For instance, if the purchase price of an item is $200 and a rebate value is predetermined to be 10% of the purchase price, then a rebate value of $20 may be loaded onto the account. Other rebate values may be determined based on the purchase price or other criteria.

As discussed above, security measures may be used to authorize activation. For instance a security code or PIN that was provided on a receipt at the point of product purchase may be prompted and received from the customer, e.g., in addition to a rebate account number associated with the account. In some embodiments, the central processor may communicate with the retailer to determine that the product was validly purchased. The central processor may also verify that the product has not been returned by the purchasing customer. If the central processor determines that a product has been returned, exchanged, submitted for warranty service, or otherwise has a status other than "validly sold and in possession of purchaser," then the rebate account may not be activated, activated partially (e.g., with conditions of use), or activated with partial value. Information about the status of a purchased item may be received from a retailer, manufacturer, or other entity.

Similarly, in some embodiments, the central processor may communicate with retailers, service providers, manufacturers, warranty providers, and other parties associated with a purchased product or service regarding the activation of a rebate account. For instance, if a rebate account has been activated and $10 of rebate value has been used by the customer, then the customer may not be able to return or service the item for instance. Alternately, in such cases, the customer may return the purchased item for an amount diminished based on the amount used in the rebate account.

Other security measures may be used to protect account ownership. For instance, the stored value account may comprise a debit account requiring a PIN for use, and the central processor may pass the PIN to the customer (e.g., via email or text message). The central processor may enable the customer to change a PIN. The account may be accessed by the customer (e.g., over the Internet as for an online banking account); and the customer may view account information such as transaction history and expiration information.

In block 280, the customer may use and/or redeem value stored in the account. For instance, the customer may use the stored value card provided with the product to make purchases. In some embodiments, the stored value card may be usable to access account funds for transactions in the same way as in other card-based accounts such as debit card accounts. The customer may use the card at merchant terminals to purchase other merchandise, for example. In some embodiments, the customer may use an account number associated with the account to make a purchase online.

In block 290, the central processor may receive account activity information. For instance, the central processor may receive transaction information about purchases made using the account, such as the date of purchase, amount of purchase, and product purchased. It should be appreciated that if the value of a rebate account is not sufficient to cover the cost of a particular transaction, the remaining funds may be covered using other customer payment methods for merchants who accept split tender.

The central processor may store this information and create a customer profile based on received customer information and monitored customer behavior. The central processor may also enable the customer to consolidate, divide, transfer funds to or from, or otherwise change the account.

It should be appreciated that other account functions are contemplated, such as those used in current credit card, stored value card, and other card-based (or purely electronic-based) accounts, such as accounts with banks.

The actions of all or merely some of the blocks may be accomplished within the scope of this invention. The actions may be completed in any order, and they may overlap in time with other actions.

Figure 3:
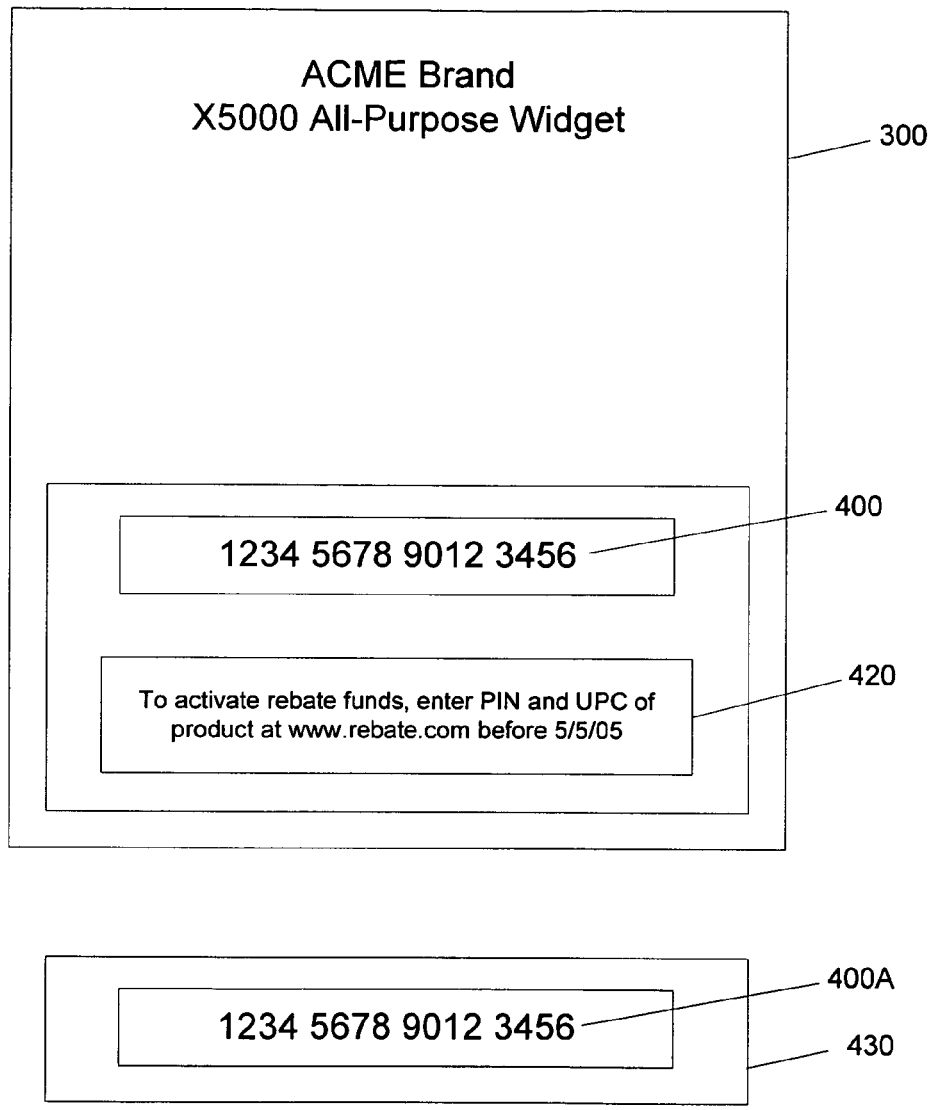
FIG. 3 shows an exemplary product comprising an identifier according to an embodiment of the invention.

FIG. 3 shows an exemplary product 300 coupled to an indicia 400 of an identifier according to an embodiment of the invention. The identifier on the indicia 400 may be associated with a rebate account. The bottom of FIG. 3 also shows an embodiment where the indicia 400A is separate from the product 300, but is instead coupled to another item such as a piece of paper 430 not associated with a product. Thus, in some embodiments, there may be no physical product; rather, the indicia 400 may be provided to a customer separately from any product.

Here, the product is an "ACME Brand X5000 All-Purpose Widget," although it will be appreciated that the product 300 may be any other good or service that may be associated with an indicia 400 of an identifier, such as a CD, DVD, ticket, phone card, stored value card, other financial product, or other good or service.

In some embodiments, the "product" 300 may be an indicia of a service. For instance, the indicia may comprise a receipt, such as a receipt for providing a product or service, or the indicia may comprise another communication related to a product or service. The product may also be an electronic product, such as a file download (e.g., music file download or video game), web page access, email, or other electronic file or program.

The indicia 400 may be any writing, printing, or other audio-visual means of communicating an identifier. It also may comprise information not disclosed visually. For instance, the indicia may comprise an RFID device capable of communicating the identifier to an authorized receiver device.

The identifier may be any number or code, such as "9876Z A1234," as shown in FIG. 3. The identifier may also comprise any rune, glyph, symbol, alpha-numeric, picture, graphic, video, sound, or other concept, e.g., in addition to an alpha-numeric. The code and/or symbol may be comprised together on a rebate indicia. The use of a non-alpha-numeric concept such as a rune in addition to an alpha-numeric may enable security measures that would not be easily compromised by typical malware or spyware designed to steal account numbers. This is because such software is typically designed to record keystrokes and other user input information, but not images. For instance, at the time of rebate account activation, the identifier may be prompted as well as a symbol provided with the identifier. The symbol may be prompted in the form of a multiple choice among several different symbols. The account may be activated by the central processor after verifying the alpha-numeric and the symbol, which may be pre-associated in an authorization database.

In some embodiments, a product may be purchased online. The rebate account identifier information (e.g., the code and/or image) may be passed electronically, e.g., in a website confirming a purchase transaction or in an email to an email address associated with the purchaser (or product recipient). The recipient of the rebate identifier may then use the identifier to activate the rebate account.

The indicia 400 may be included with (or on) the product 300, or it may be provided separately. FIG. 3 shows an indicia 400 printed on the product and another indicia 400A provided on a receipt or other communication 330 separate from the product 300. Thus, the identifier may be provided on more than one (or only one) indicia 300.

The indicia 400 may have a physical embodiment, such as a sticker on a label of a product or a product container, or a printout on a receipt 300A. The indicia 400 may also be electronic. For instance, the indicia 400 may be an email, text message, voicemail message, or other communication that indicates the identifier. In some embodiments, the indicia may be sent electronically to the purchaser of the product (or to a recipient designated by the purchaser, or to another person). For instance, the email may be an indicia that lists the identifier in the text of the email. The indicia 400 may also be any other means of communicating the identifier to an end user.

The product 300 and/or indicia 400 may comprise identifier redemption instructions 420. The instructions 420 may indicate how an identifier may be used to activate a rebate account (or otherwise enable access to a rebate account associated with the identifier). For instance, the instructions 420 may provide provider information, redemption expiration dates, and any other data associated with the product 300, identifier, and/or other product redemption information. The instructions 420 may be provided with the identifier indicia 400 or another indicia. For security purposes, the instructions 420 may be provided to the user separately from the indicia 400. For instance, the indicia 400 may be provided with the product, while instructions 420 may be provided via mail (or email) after purchase or product registration.

Figure 4:
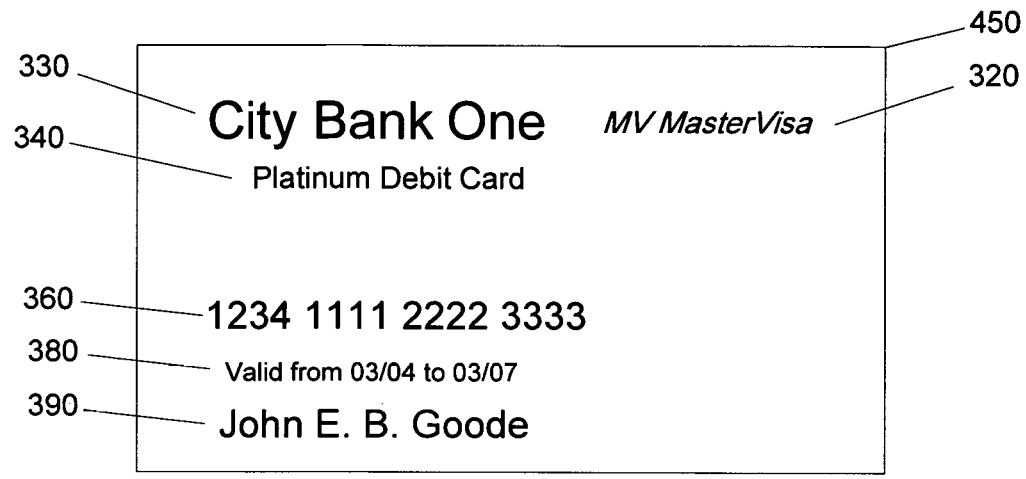
FIG. 4 shows an exemplary stored value rebate card according to an embodiment of the invention.
Figure 4:
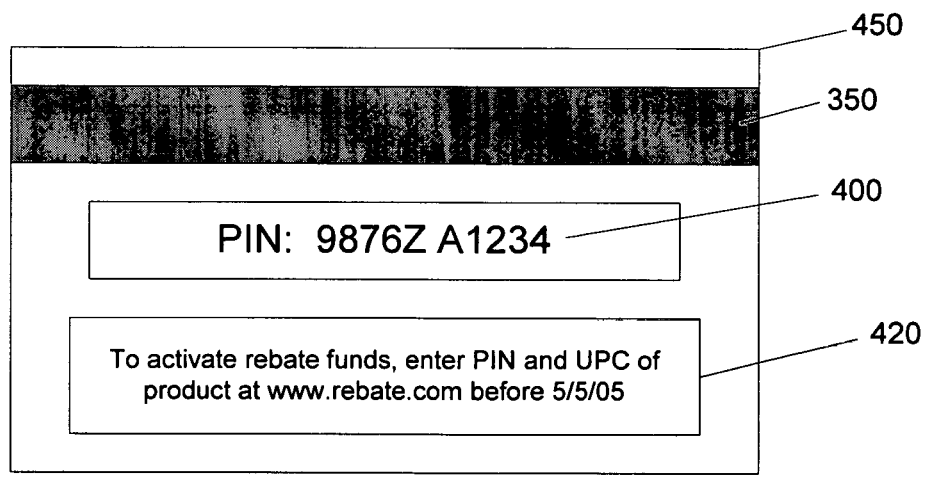

FIG. 4 shows an exemplary stored value rebate card 450 according to an embodiment of the invention. The rebate card 450 may be included with or otherwise coupled to or provided with a product. The customer may receive the card 450 when the customer purchases the product.

FIG. 4 shows the front view and rear view of the rebate card 450. The rebate card may comprise a transaction card 300, such as a credit card, debit card, phone card, or other transaction card. The card 450 may comprise an issuer indicia 330, a credit network indicia 320, a card title 340, an account number or card number 360, validity dates and/or expiration data 380, a magnetic stripe 350, redemption instructions 420, and any other indicia of information associated with the account.

In some embodiments, the rebate card 450 may comprise a cardholder name 400, e.g., if the card is passed to a customer after the customer purchases the product. For instance, the card may be created at the point of sale by the merchant after the customer identifies the customer's name.

In the embodiment shown in FIG. 4, the indicia 400 may comprise a number printed on a sticker (or other adhesive) attached to the back of the card. The identifier may or may not be coupled to a product (e.g., via an adhesive). It should be appreciated that in some embodiments, there may be no sticker indicia 400, and the card number 360 may instead be the indicia of the identifier.

Figure 5:
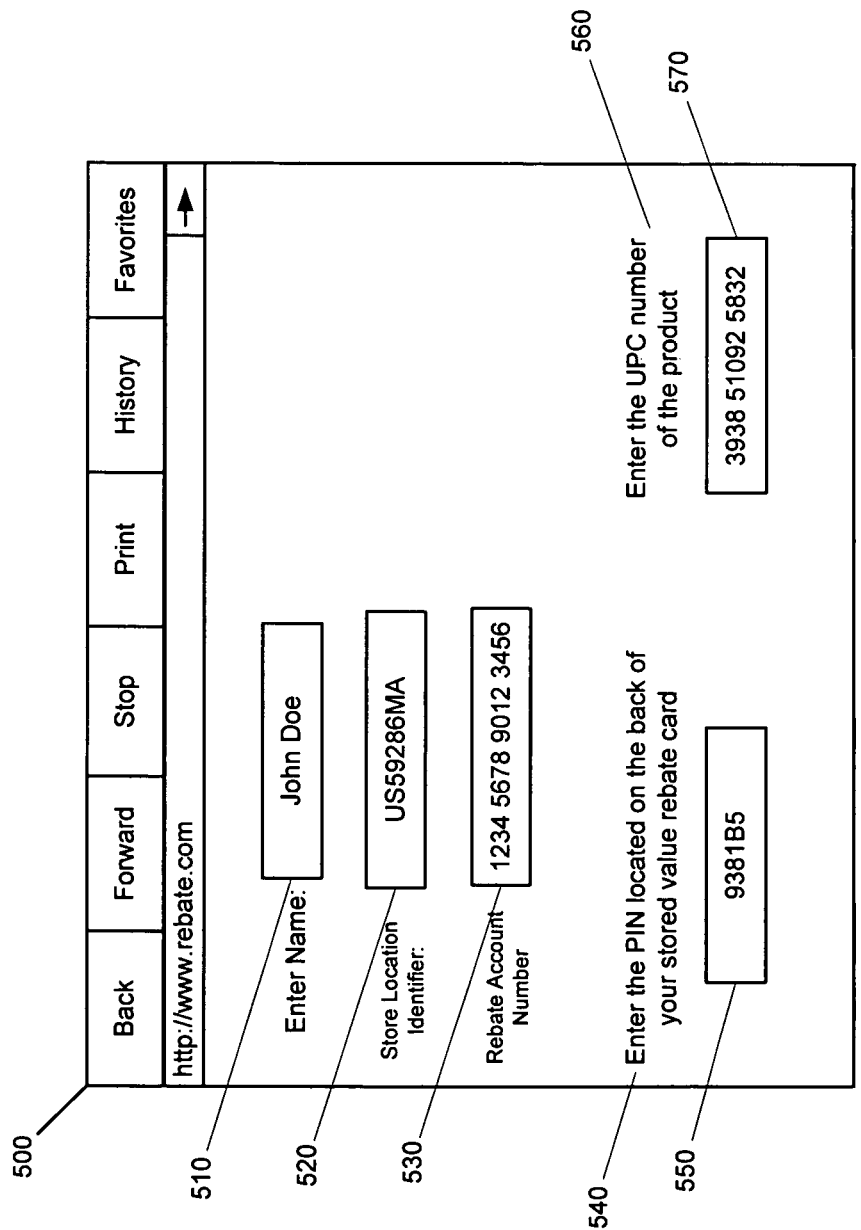
FIG. 5 shows an exemplary rebate account activation interface according to an embodiment of the invention.

FIG. 5 shows an exemplary rebate account activation interface 500 according to an embodiment of the invention. The interface 500 may comprise a webpage of a rebate account provider. The webpage 500 may comprise a customer name prompt 510, a store identifier prompt 520 (e.g., a store location identifier prompt), rebate account identifier prompts 530, 540 including a rebate account number prompt 530, a rebate identifier prompt 550, a product identifier prompt 560 (e.g., a UPC symbol prompt), and a product identifier 570.

In some embodiments, instructions may be provided to the customer directing the customer to the interface for rebate activation. After entering the information at the prompts 510-560 and passing such information to the central processor, the rebate account may be activated. Additional prompts may request additional customer, merchant, transaction, and rebate-related information. For instance, interface 500 may request the customer to register the purchased product.

The embodiments of the present inventions are not to be limited in scope by the specific embodiments described herein. For example, although many of the embodiments disclosed herein have been described with reference to rebate cards and purchases of merchandise, the principles herein are equally applicable to other devices associated with a stored value account and other transactions such as the purchase of a service, the establishing of an account, or other behavior associated with a merchant. For instance, the principles are applicable to rebates issued as smart cards or other devices. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

What is claimed is:

1. A computer implemented method for creating a stored value account based on a purchase transaction, the computer implemented method comprising:
    distributing an indicia of a rebate account identifier to a merchant that is distributed to a customer at a point of sale in conjunction with a purchase of at least one product or service;
    receiving, by a computer processor, a confirmation from the merchant of the purchase of the at least one product or service associated with the indicia wherein the at least one product or service is purchased with the indicia;
    receiving, from the customer, a request, following the customer obtaining the indicia in conjunction with the purchase, comprising the rebate account identifier, to activate a stored value account associated with the rebate account identifier; and
    activating the stored value account, by a computer processor, the stored value account comprising information about a rebate value based upon the purchase of the at least one product or service and the rebate value is a separate value from a value of the purchase;
    loading the stored value account with funds, comprising the rebate value, for conducting transactions over a transaction network;
    providing the customer access to the funds; and
    receiving status updates from the merchant relating to subsequent actions by the customer regarding the at least one product or service, the subsequent actions comprising requesting an exchange or refund of the at least one product or service.

2. The computer implemented method of claim 1, wherein the stored value account comprises information about the customer's name and an account number.

3. The computer implemented method of claim 1, wherein the activating occurs at the point of sale.

4. The computer implemented method of claim 1, further comprising:
    receiving personal information associated with the customer, wherein the act of activating occurs based on receipt of the personal information.

5. The computer implemented method of claim 1, further comprising:
    receiving personal information associated with the customer, wherein the activating occurs based on receipt of the personal information and a verification.

6. The computer implemented method of claim 1, wherein the purchase of at least one product or service, further comprises:
    receiving personal information associated with the customer; and
    registering the customer with the at least one product or service based on receipt of the personal information.

7. The computer implemented method of claim 6, wherein the activating and the registering both occur at the point of sale.

8. The computer implemented method of claim 6, wherein the activating is based on the registering.

9. The computer implemented method of claim 1, wherein the rebate account identifier comprises an account number of the stored value account.

10. The computer implemented method of claim 1, wherein the stored value account is usable for the transactions from at least one of:
    one or more specific merchants;
    one or more specific manufacturers; and
    one or more specific service providers.

11. The computer implemented method of claim 1, wherein the indicia is usable to access the stored value account for conducting the transactions.

12. The computer implemented method of claim 1, wherein the indicia comprises information about the rebate value and instructions about how to activate the stored value account.

13. The computer implemented method of claim 1, wherein the indicia further comprises a graphic, wherein the activating is further based on receiving information about the graphic.

14. The computer implemented method of claim 1, wherein the rebate value comprises at least one of a plurality of possible rebate values based on at least one of a circumstance of the purchase of at least one product or service, a characteristic of the customer, and a circumstance of the activating.

15. The computer implemented method of claim 14, wherein the indicia comprises information describing the plurality of possible rebate values and the at least one of a circumstance of the purchase of at least one product or service, a characteristic of the customer, and a circumstance of the activating.

16. The computer implemented method of claim 1, wherein the indicia is coupled with the at least one purchased product or service when the indicia is passed to the customer.

17. The computer implemented method of claim 1, wherein the request is received over the Internet at a website.

18. The computer implemented method of claim 1, further comprising:
    receiving from the customer a request to add funds to the account.

19. The computer implemented method of claim 1, further comprising:
    consolidating the stored value account with at least one other account.

20. The computer implemented method of claim 19, wherein the at least one other account comprises at least one of a DDA account, a credit card account, a prepaid account, a debit account, and a checking account.

21. The computer implemented method of claim 1, further comprising:
receiving from the customer a request to transfer ownership of the account to another entity.

22. The computer implemented method of claim 1, wherein the customer receives a transaction identifier from a merchant at the point of sale, wherein the transaction identifier is received separate from the indicia, further comprising:
receiving the transaction identifier from the customer, wherein the activating is further based on receiving the transaction identifier.

23. The computer implemented method of claim 1, wherein the activating is further based on receipt of the confirmation.

24. The computer implemented method of claim 1, wherein the rebate value is determined based on a purchase amount associated with the purchase of at least one product or service.

25. The computer implemented of claim 1, wherein the stored value account was not previously associated with the customer.

26. A system for creating a stored value account based on a purchase transaction, comprising:
a processor; and
a memory comprising computer-readable instructions which when executed by the processor cause the processor to perform the steps comprising:
distributing an indicia of a rebate account identifier to a merchant that is distributed to a customer at a point of sale in conjunction with a purchase of at least one product or service;
receiving, by a computer processor, a confirmation from the merchant of the purchase of the at least one product or service associated with the indicia wherein the at least one product or service is purchased with the indicia;
receiving, from the customer, a request, following the customer obtaining the indicia in conjunction with the purchase, comprising the rebate account identifier, to activate a stored value account associated with the rebate account identifier; and
activating the stored value account by a computer processor, the stored value account comprising information about a rebate value based upon the purchase of the at least one product or service and the rebate value is a separate value from a value of the purchase;
loading the stored value account with funds, comprising the rebate value, for conducting transactions over a transaction network; and
providing the customer access to the funds; and
receiving status updates from the merchant relating to subsequent actions by the customer regarding the at least one product or service associated with the indicia, the subsequent actions comprising requesting an exchange or refund of the at least one product or service.

27. A non-transitory computer-readable medium encoded with computer program code to create a stored value card account as a rebate based on a purchase, the program code effective when executed to cause a data processing system to perform the following:
distributing an indicia of a rebate account identifier to a merchant that is further distributed to a customer at a point of sale in conjunction with a purchase of at least one product or service;
receiving a confirmation of the purchase from the merchant of the at least one product or service associated with the indicia wherein the at least one product or service is purchased with the indicia;
receiving, from the customer, following the purchase, a request comprising the rebate account identifier to activate a stored value account associated with the rebate account identifier; and
activating the stored value account by a computer processor, the stored value account comprising information about:
(a) the customer's name;
(b) a rebate value based on the purchase of the at least one product or service wherein the rebate value is a separate value from a value of the purchase; and
(c) an account number; and
loading funds comprising the rebate value into the stored value account and the funds are usable for conducting transactions over a transaction network;
providing the customer access to the funds;
receiving status updates from the merchant relating to subsequent actions by the customer regarding the at least one product or service associated with the indicia, the subsequent actions comprising requesting an exchange or refund of the at least one product or service.

28. A computer implemented method for creating a stored value account based on a purchase transaction, the computer implemented method comprising:
distributing an account access device to a merchant, the account access device comprising a rebate account identifier and instructions about activating a stored value account associated with the rebate account identifier, the account access device being further distributed to a customer at a point of sale of in conjunction with a purchase of at least one product or service at the merchant;
receiving, by a computer processor, a confirmation from the merchant of the purchase of the at least one product or service associated with the indicia wherein the at least one product or service is purchased with the indicia;
receiving from the customer a request, following the purchase, comprising the rebate account identifier, to activate the stored value account;
prompting the customer for personal information associated with the customer, the rebate account identifier, and purchase information;
receiving from the customer personal information associated with the customer, the rebate account identifier, and the purchase information;
registering the product or service based on the receipt of the personal information, the rebate account identifier, and the purchase information; and
activating the stored value account by a computer processor based on the receipt of the personal information, the rebate account identifier, and the purchase information, and the stored value account stores a rebate value based on the purchase of at least one product or service and the rebate value is a separate value from a value of the purchase, that is usable for one or more purchases on a transaction network, and the access device is usable to access the stored value account, and further the stored value account comprises information about the customer, a stored value account number, and the rebate value; and
loading the stored value account with funds comprising the rebate value that are usable for conducting transactions over a transaction network;
providing the customer access to the funds; and receiving status updates from the merchant relating to subsequent actions by the customer regarding the at least one product or service associated with the indicia, the subsequent actions comprising requesting an exchange or refund of the at least one product or service.

29. The computer implemented method of claim 28, wherein the rebate value may comprise at least one of a plurality of possible rebate values based on at least one of a circumstance of the purchase of the at least one product or service, a characteristic of the customer, and a circumstance of the activating action, and wherein the indicia comprises information describing the plurality of possible rebate values and the at least one of a circumstance of the purchase of the at least one product or service, a characteristic of the customer, and a circumstance of the activating action.

30. The computer implemented of claim 28, wherein the stored value account was not previously associated with the customer.

* * * * *

UNITED STATES PATENT AND TRADEMARK OFFICE
CERTIFICATE OF CORRECTION

| | | |
|---|---|---|
| PATENT NO. | : 8,630,898 B1 | Page 1 of 1 |
| APPLICATION NO. | : 11/061570 | |
| DATED | : January 14, 2014 | |
| INVENTOR(S) | : Knackstedt et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1755 days.

Signed and Sealed this
Eleventh Day of August, 2015

Michelle K. Lee
*Director of the United States Patent and Trademark Office*